(12) United States Patent
Kowaka

(10) Patent No.: US 9,124,741 B2
(45) Date of Patent: Sep. 1, 2015

(54) ELECTRONIC DEVICE FOR DISPLAYING A PRINT PREVIEW

(71) Applicant: KYOCERA Document Solutions Inc., Osaka (JP)

(72) Inventor: Makoto Kowaka, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/264,583

(22) Filed: Apr. 29, 2014

(65) Prior Publication Data

US 2014/0320919 A1   Oct. 30, 2014

(30) Foreign Application Priority Data

Apr. 30, 2013   (JP) ................................. 2013-095360
Jun. 28, 2013   (JP) ................................. 2013-136142

(51) Int. Cl.
*H04N 1/00*   (2006.01)

(52) U.S. Cl.
CPC ................................. *H04N 1/0044* (2013.01)

(58) Field of Classification Search
USPC ............... 358/1.15, 1.8, 1.18, 296, 502, 540; 382/159

See application file for complete search history.

(56) References Cited

U.S. PATENT DOCUMENTS

| | | | | |
|---|---|---|---|---|
| 7,526,122 | B2 * | 4/2009 | Usuda et al. | 382/159 |
| 7,564,580 | B2 * | 7/2009 | Silverbrook | 358/1.8 |
| 8,294,943 | B2 * | 10/2012 | Itoh | 358/1.18 |
| 9,007,633 | B2 * | 4/2015 | Sakaida et al. | 358/1.15 |
| 2005/0213174 | A1 * | 9/2005 | Maki et al. | 358/540 |
| 2008/0316526 | A1 * | 12/2008 | Matsuzaki et al. | 358/1.15 |
| 2010/0005156 | A1 * | 1/2010 | Wesby | 709/219 |
| 2011/0313771 | A1 * | 12/2011 | Marggraff | 704/258 |
| 2012/0042288 | A1 * | 2/2012 | Liao et al. | 715/863 |

FOREIGN PATENT DOCUMENTS

JP   2012-256180 A   12/2012

* cited by examiner

*Primary Examiner* — Allen H Nguyen
(74) *Attorney, Agent, or Firm* — McDonnell Boehnen Hulbert & Berghoff LLP

(57) ABSTRACT

An electronic device in the present disclosure includes the following: an imaging device configured to scan a paper sheet, wherein the paper sheet comprises a first side and a second side, wherein scanning the paper sheet produces an image; a display device; a printing image acquisition unit configured to acquire a printing image; an image forming apparatus configured to print the printing image; and a display control unit configured to control the display device to display, if the produced image includes an image of a paper sheet, a composite image that combines the acquired printing image and the image of the paper sheet within the produced image.

11 Claims, 20 Drawing Sheets ated in FIG. 12 performed when a binding orientation is set
ELECTRONIC DEVICE FOR DISPLAYING A PRINT PREVIEW

REFERENCE TO RELATED APPLICATIONS

This application is based upon and claims priority to the corresponding Japanese Patent Application No. 2013-095360, filed in the Japan Patent Office on Apr. 30, 2013, and Japanese Patent Application No. 2013-136142, filed in the Japan Patent Office on Jun. 28, 2013, the entire contents of which are incorporated herein by reference.

FIELD

The present disclosure relates to an electronic device that displays a composite image, which combines an image scanned by an imaging device with additional information, on a display device as a print preview.

BACKGROUND

In a typical print preview, before an image to be printed by an image forming apparatus is actually printed on a paper sheet, a preview of the image to be printed on the paper sheet is artificially displayed.

In the typical print preview, an appearance of an artificially displayed paper sheet may differ from an appearance of an actual paper sheet when, for example, a color of the artificially displayed paper sheet is a fixed color, such as white, that is different from a color of the actual paper sheet. Accordingly, there is a fear in that an artificial display of the preview of the image to be printed on a paper sheet may differ from the resulting printed image obtained by actually printing the image on a paper sheet.

SUMMARY

An electronic device according to an embodiment of the present disclosure includes: an imaging device; a display device; a printing image acquisition unit; an image forming apparatus; and a display control unit. The imaging device is configured to scan a paper sheet, wherein the paper sheet comprises a first side and a second side, wherein scanning the paper sheet produces an image. The printing image acquisition unit is configured to acquire a printing image. The image forming apparatus is configured to print the printing image. The display control unit is configured to control the display device to display, if the produced image includes an image of a paper sheet, a composite image that combines the acquired printing image and the image of the paper sheet within the produced image.

A print preview method according to one embodiment of the present disclosure includes: (i) scanning, via an imaging device, a paper sheet, wherein the paper sheet comprises a first side and a second side, wherein scanning the paper sheet produces an image; (ii) acquiring, via a printing image acquisition unit, a printing image; (iii) printing, via an image forming apparatus, the printing image; and (iv) controlling, via a display control unit, a display device to display, if the produced image includes an image of a paper sheet, a composite image in which the acquired printing image and the image of the paper sheet included in the produced image are combined.

A non-transitory computer-readable recording medium according to one embodiment of the present disclosure has stored a print preview program executable by a computer of an electronic device. The print preview program includes: a first program code for causing the computer to scan a paper sheet, wherein the paper sheet comprises a first side and a second side, wherein scanning the paper sheet produces an image; a second program code for causing the computer to acquire a printing image; a third program code for causing the computer to print the printing image; and a fourth program code for causing the computer to control a display device to display, if the produced image includes an image of a paper sheet, a composite image in which the acquired printing image and an image of the paper sheet included in the produced image are combined.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure is described with reference to the accompanying drawings.

Figure 1:
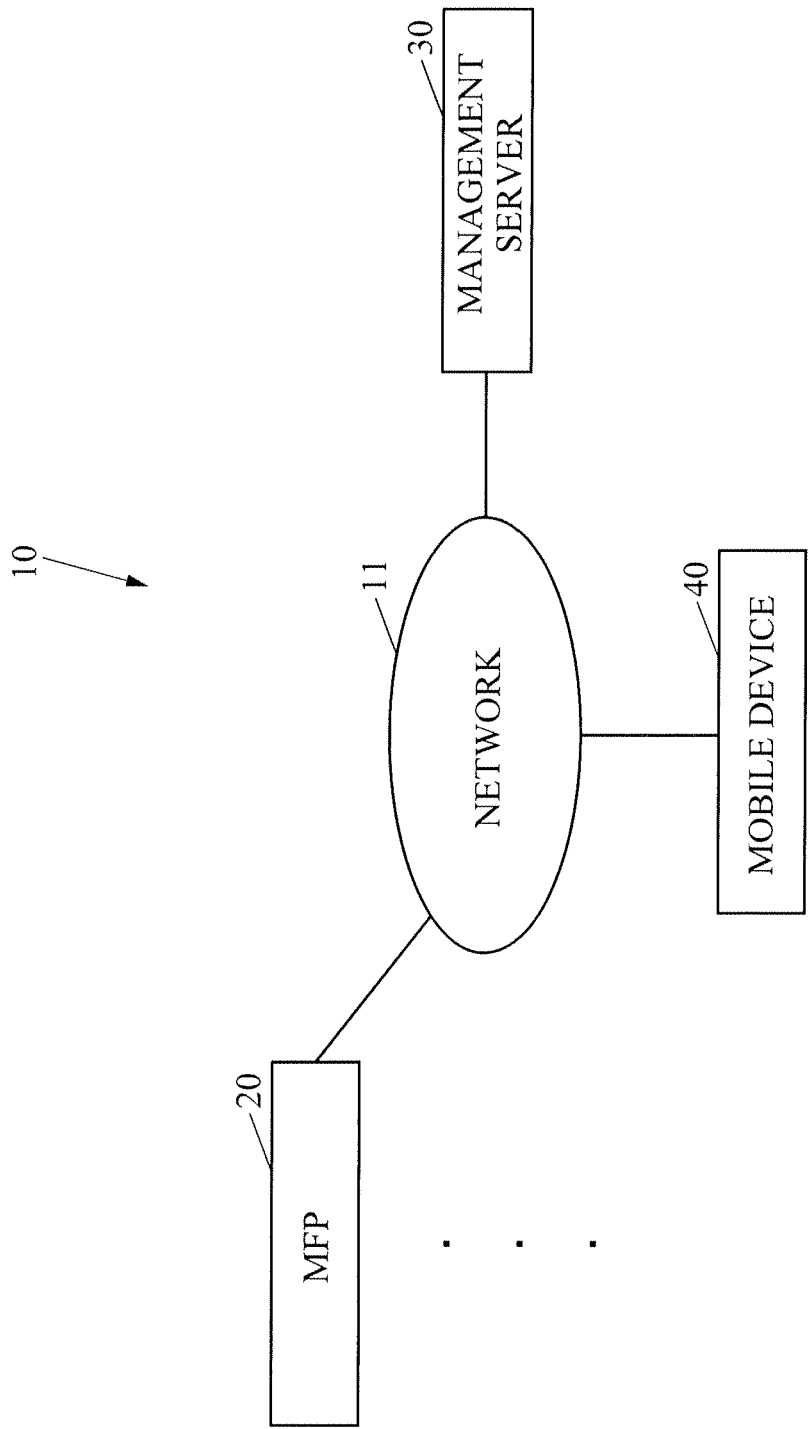
FIG. 1 illustrates a configuration of an image forming system according to an embodiment of the present disclosure.

FIG. 1 illustrates a configuration of an image forming system 10 according to the embodiment.

As illustrated in FIG. 1, the image forming system 10 includes a plurality of multifunction peripherals (MFPs) including an MFP 20, a management server 30 such as a personal computer (PC) that manages the plurality of MFPs, and a mobile device 40 such as a smartphone. The plurality of MFPs, the management server 30, and the mobile device 40 of the image forming system 10 are communicably connected to one another through a network 11 such as a local area network (LAN) or the Internet. The mobile device 40 constitutes an electronic device according to the present disclosure.

The configuration of each of the MFPs of the image forming system 10 is the same as the configuration of the MFP 20. Therefore, the MFP 20 is described below as a representative of the plurality of MFPs of the image forming system 10.

Figure 2:
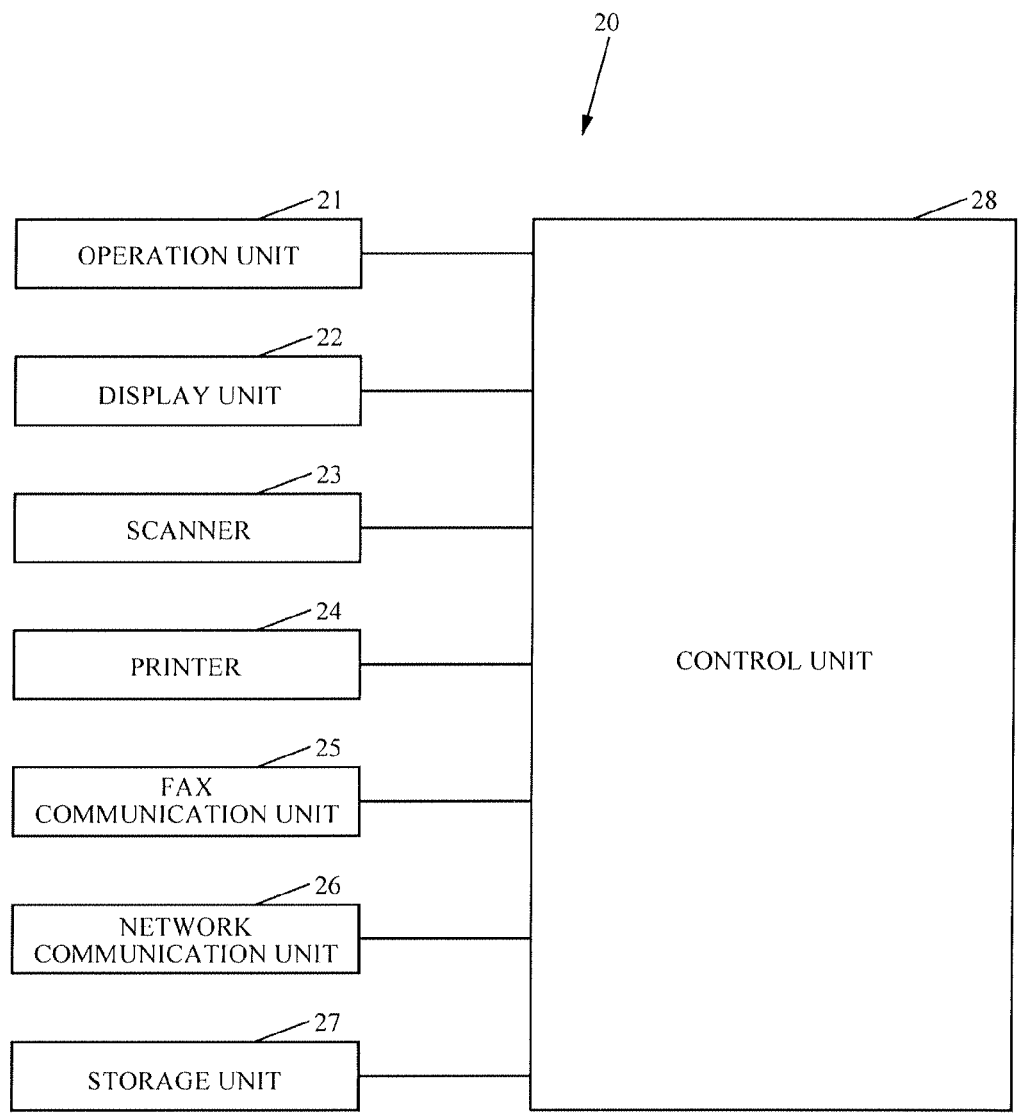
FIG. 2 illustrates a configuration of an MFP illustrated in FIG. 1.

FIG. 2 illustrates the configuration of the MFP 20.

As illustrated in FIG. 2, the MFP 20 includes an operation unit 21 serving as an input device such as buttons through which various operations are input by a user, a display unit 22 serving as a display device such as a liquid crystal display (LCD) that displays various kinds of information, a scanner 23 that reads an image from an original document, a printer 24 that executes printing on a paper sheet such as printing paper, a FAX communication unit 25 that performs FAX communications to and/or from an external facsimile machine (not shown) through a communication line such as a public telephone line, a network communication unit 26 that communicates to and/or from an external apparatus through the network 11 illustrated in FIG. 1, a storage unit 27 including a nonvolatile storage device such as an electrically erasable programmable read only memory (EEPROM) or a hard disk drive (HDD) that stores various kinds of data, and a control unit 28 that controls the entire MFP 20.

The operation unit 21 may include an input device including a touch panel together with the display unit 22.

The control unit 28 includes, for example, a central processing unit (CPU), a read only memory (ROM) that stores programs and various kinds of data, and a random access memory (RAM) used as a work area for the CPU. The CPU executes a program stored in the ROM or the storage unit 27.

Figure 3:
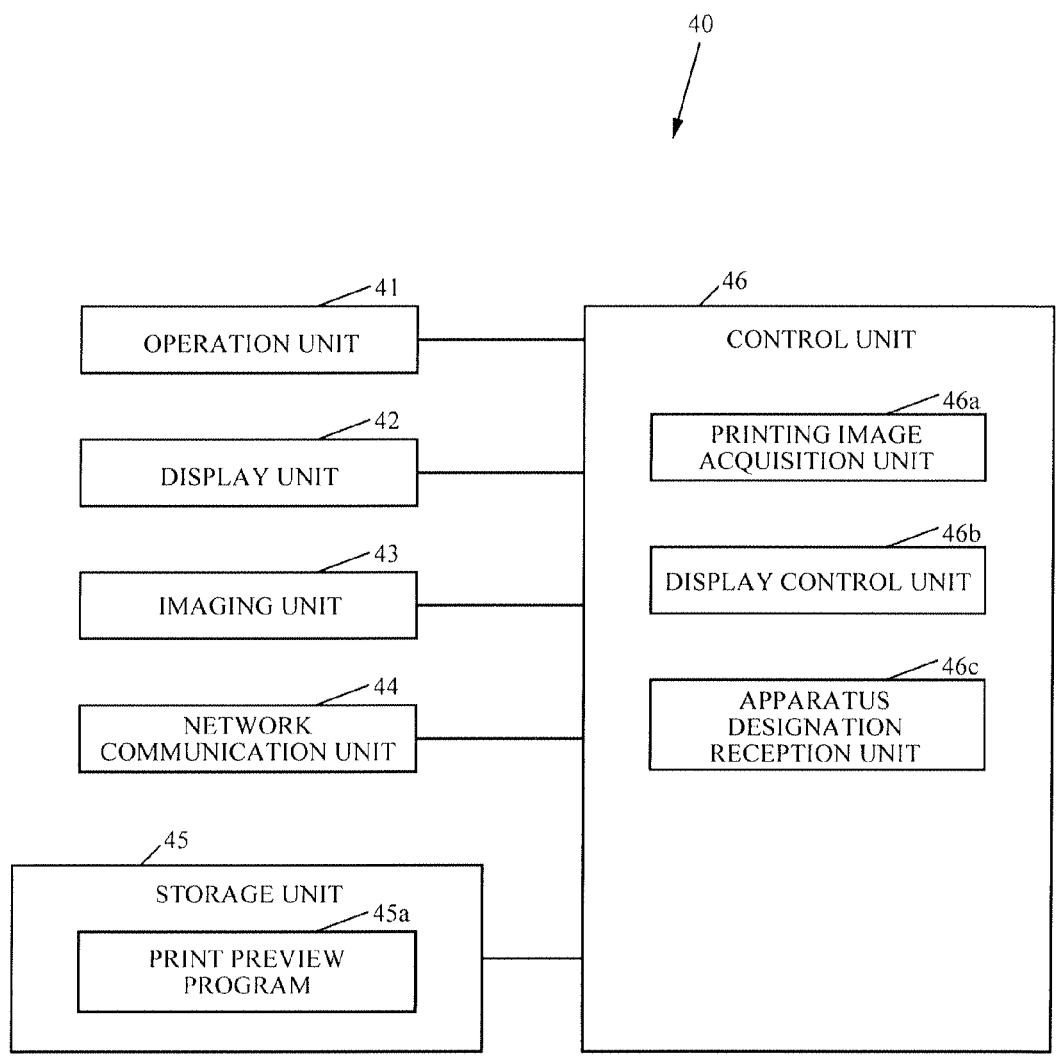
FIG. 3 illustrates a configuration of a mobile device illustrated in FIG. 1.

FIG. 3 illustrates a configuration of the mobile device 40.

As illustrated in FIG. 3, the mobile device 40 includes an operation unit 41 serving as an input device with, for example, buttons through which various operations are input, a display unit 42 serving as a display device such as an LCD that displays various kinds of information, an imaging unit 43 serving as an imaging device that photographs a still image or a moving image, a network communication unit 44 that communicates to and/or from an external apparatus through the network 11 illustrated in FIG. 1, a storage unit 45 including a nonvolatile storage device such as an HDD that stores programs and various kinds of data, and a control unit 46 that controls the entire mobile device 40.

The operation unit 41 may include an input device including a touch panel together with the display unit 42.

The storage unit 45 stores a print preview program 45a executed by the control unit 46.

The control unit 46 includes, for example, a CPU, a ROM that stores programs and various kinds of data, and a RAM used as a work area for the CPU. The CPU executes a program stored in the ROM or the storage unit 45.

The control unit 46 executes the print preview program 45a stored in the storage unit 45, to thereby function as a printing image acquisition unit 46a, a display control unit 46b, and an apparatus designation reception unit 46c. The printing image acquisition unit 46a acquires a printing image to be printed on the paper sheet by the MFP. The display control unit 46b controls the display unit 42 to display, when a paper sheet is included in an image scanned by the imaging unit 43, a composite image that combines the printing image acquired by the printing image acquisition unit 46a on the paper sheet within the scanned image. The apparatus designation reception unit 46c receives a designation of the MFP to be used for printing the printing image.

Next, a description is made of an operation of the image forming system 10.

First, a description is made of the operation of the image forming system 10 performed when the printing image is generated by reading an image from an original document.

In response to an instruction issued through the operation unit 21, the control unit 28 of the MFP 20 reads an image from an original document by the scanner 23 to generate a printing image, and transmits the generated printing image to the management server 30 through the network communication unit 26.

Therefore, the management server 30 receives and stores the printing image transmitted from the MFP 20.

Next, a description is made of an operation of the mobile device 40 performed when a preview image is displayed.

Figure 4:
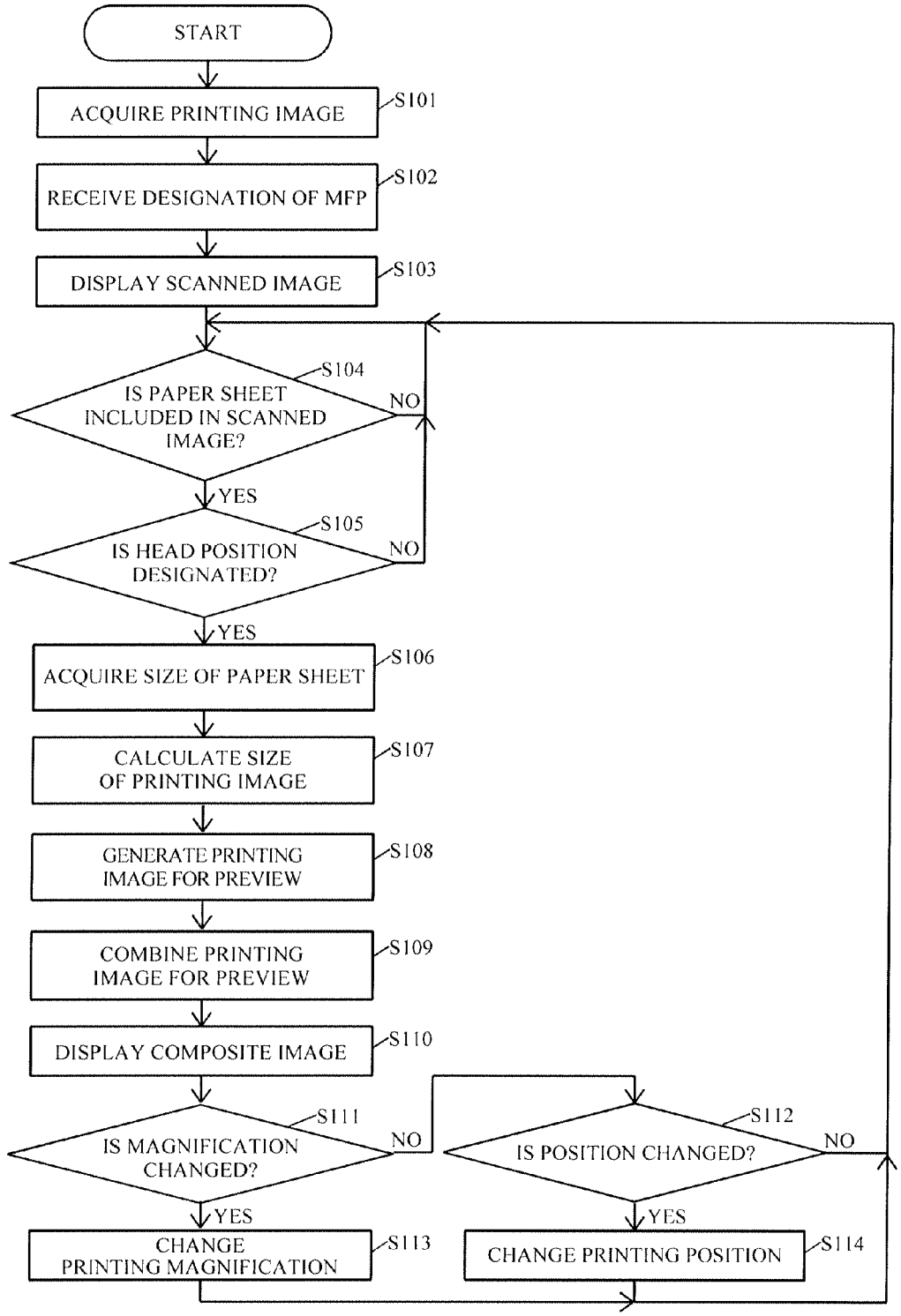
FIG. 4 illustrates an operation of the mobile device illustrated in FIG. 3 performed when a preview image is displayed.

The user of the mobile device 40 may activate the print preview program 45a when it is desired to display the preview image on the mobile device 40, to thereby cause the control unit 46 of the mobile device 40 to execute an operation illustrated in FIG. 4.

FIG. 4 illustrates the operation of the mobile device 40 performed when the preview image is displayed.

As illustrated in FIG. 4, the printing image acquisition unit 46a of the mobile device 40 acquires the printing image to be printed on the paper sheet by the MFP through the network communication unit 44 (Step S101). The printing image acquisition unit 46a may acquire from the management server 30 the printing image generated from the original document by the MFP and stored by the management server 30, or may acquire a printing image other than the printing image generated from the original document by the MFP and stored by the management server 30. For example, the printing image acquisition unit 46a may acquire a printing image generated from the original document by the MFP 20 and transmitted directly from the MFP 20 to the mobile device 40, or may acquire a printing image generated by a PC (not shown) and transmitted to the mobile device 40.

Subsequently, the apparatus designation reception unit 46c of the mobile device 40 displays on the display unit 42 an MFP designation screen used for receiving a designation of the MFP to be used for print the printing image, to thereby receive the designation of the MFP through the operation unit 41 (Step S102).

Subsequently, the display control unit 46b of the mobile device 40 displays the image scanned by the imaging unit 43 on the display unit 42 (Step S103). Note that an image that is "scanned" may be photographed, scanned, imaged, picked up, or otherwise read in by any suitable scanner, imaging device, imaging unit, or the like.

Subsequently, the display control unit 46b determines whether or not the paper sheet is included in the scanned image until the display control unit 46b determines that the paper sheet is included in the scanned image (Step S104). Here, the display control unit 46b recognizes the paper sheet itself within the scanned image by an image recognition technology, to thereby recognize that the paper sheet is included in the scanned image. Note that, the user of the mobile device 40 can include the paper sheet in the scanned image by adjusting a position and an orientation of the mobile device 40 so that the paper sheet is included in the scanned image displayed on the display unit 42.

When the display control unit 46b determines in Step S104 that the paper sheet is included in the scanned image, the display control unit 46b determines whether or not a head position of the paper sheet within the scanned image has been designated (Step S105). The user of the mobile device 40 can designate the head position by setting the head position of the paper sheet within the scanned image displayed on the display unit 42 through the operation unit 41.

Figure 5:
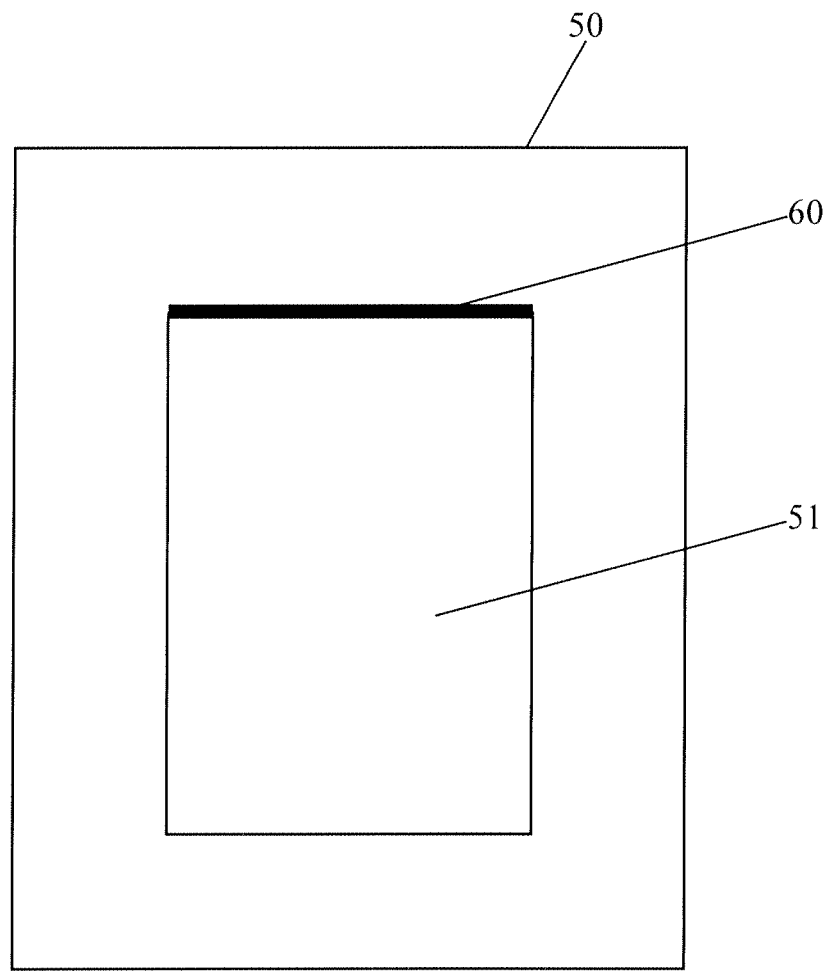
FIG. 5 illustrates an example of a head position of a paper sheet within a scanned image displayed on a display unit illustrated in FIG. 3.

FIG. 5 illustrates an example of the head position of the paper sheet within the scanned image displayed on the display unit 42.

In FIG. 5, a scanned image 50 displayed on the display unit 42 includes a paper sheet 51. In the paper sheet 51 within the scanned image 50, a head position 60 designated by the user is indicated by being highlighted by a thick line.

As illustrated in FIG. 4, when determining in Step S105 that the head position has not been designated, the display control unit 46b returns to the processing of Step S104 again.

When the display control unit 46b determines in Step S105 that the head position has been designated, the display control unit 46b acquires a size of the paper sheet within the scanned image with reference to the head position designated in Step S105 (Step S106). Specifically, the display control unit 46b acquires a vertical length of the paper sheet within the scanned image and a horizontal length of the paper sheet within the scanned image.

Subsequently, the display control unit 46b calculates the size of the printing image within the scanned image based on the size acquired in Step S106 and a magnification of the printing image used when the printing image is printed on the paper sheet (hereinafter referred to as "printing magnification") (Step S107). For example, in a case where the vertical length and the horizontal length of the paper sheet within the scanned image are 52 and 37, respectively, the display control unit 46b calculates a vertical length and a horizontal length of the printing image within the scanned image as 52 and 37, respectively, when the printing magnification is 1, and calculates the vertical length and the horizontal length of the printing image within the scanned image as 104 and 74, respectively, when the printing magnification is 2. Note that, an initial value of the printing magnification is, for example, "1".

Subsequently, the display control unit 46b generates the printing image for a preview image (hereinafter referred to as "preview of the printing image") with the size calculated in Step S107 based on the printing image acquired in Step S101 and the size calculated in Step S107 (Step S108). Here, the display control unit 46b changes an appearance of the preview of the printing image based on an output characteristic of the MFP received in Step S102. For example, when the MFP received in Step S102 is a dedicated monochrome machine, the display control unit 46b changes the preview of the printing image to a monochrome image. Further, even when the MFP received in Step S102 is a color machine, the display control unit 46b may change the preview of the printing image based on color reproducibility of the MFP.

Subsequently, the display control unit 46b generates a composite image that combines the preview of the printing image generated in Step S108 with the scanned image, in a position corresponding in the paper sheet within the scanned image to the position of an origin of the printing image with respect to the paper sheet used when the printing image is printed on the paper sheet (hereinafter referred to as "printing position") (Step S109). Note that, an initial value of the printing position is, for example, the position of a left end of a top edge of the paper sheet when viewed with the head position placed at the top.

Subsequently, the display control unit 46b displays the composite image generated in Step S109, in other words, the preview image on the display unit 42 (Step S110). In other words, for example, the display control unit 46b displays such a preview image as illustrated in FIG. 6 on the display unit 42 by an augmented reality (AR) technology.

Figure 6:
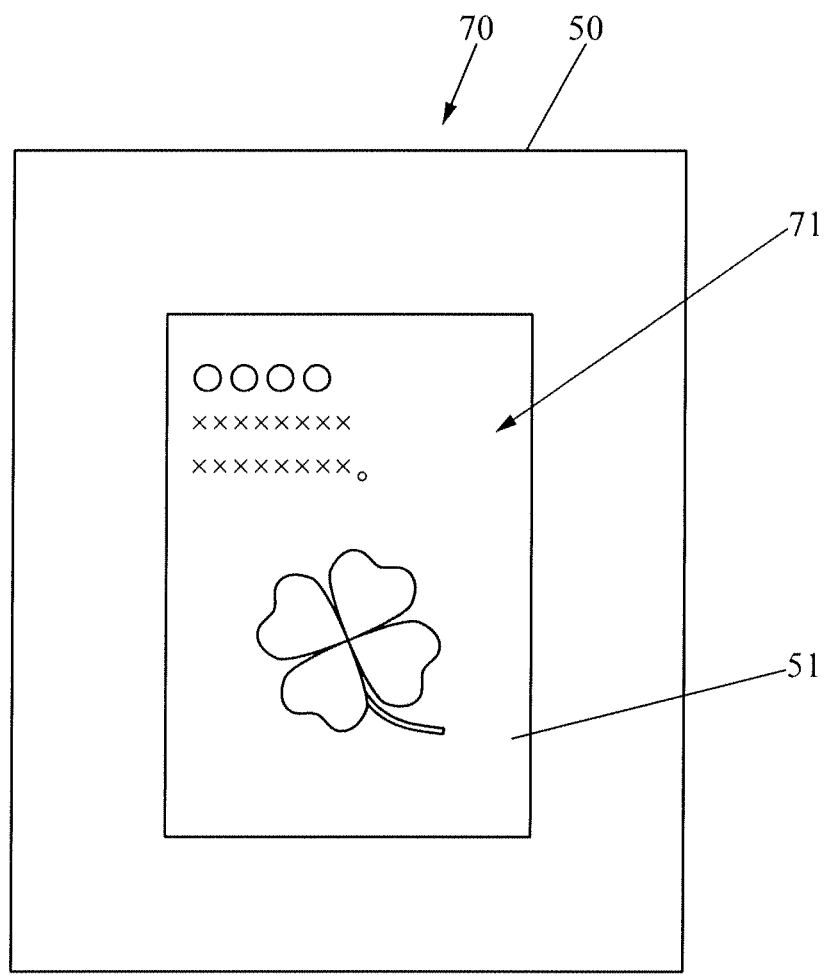
FIG. 6 illustrates an example of a preview image displayed on the display unit illustrated in FIG. 3.

A preview image 70 as illustrated in FIG. 6 is a composite image that combines a preview of the printing image 71 with the scanned image 50.

As illustrated in FIG. 4, the display control unit 46b determines whether or not the magnification of the preview of the printing image has been changed through the operation unit 41 after the processing of Step S110 (Step S111). For example, the user of the mobile device 40 can change the magnification of the preview of the printing image by directly operating the preview of the printing image displayed on the display unit 42 through the operation unit 41, and can also change the magnification of the preview of the printing image by specifically designating a numerical value indicating the magnification through the operation unit 41.

When the display control unit 46b determines in Step S111 that the magnification of the preview of the printing image has not been changed, the display control unit 46b determines whether or not the position of the preview of the printing image with respect to the paper sheet within the scanned image has been changed through the operation unit 41 (Step S112). For example, the user of the mobile device 40 can change the position of the preview of the printing image by directly operating the preview of the printing image displayed on the display unit 42 through the operation unit 41, and can also change the position of the preview of the printing image by specifically designating a numerical value indicating the position through the operation unit 41.

When the display control unit 46b determines in Step S112 that the position of the preview of the printing image with respect to the paper sheet within the scanned image has not been changed, the display control unit 46b returns to the processing of Step S104 again.

When the display control unit 46b determines in Step S111 that the magnification of the preview of the printing image has been changed, the display control unit 46b changes the printing magnification based on the change in the magnification of the preview of the printing image (Step S113), and returns to the processing of Step S104 again. In other words, the display control unit 46b displays, for example, such a preview image as illustrated in FIG. 7 on the display unit 42 by the AR technology.

Figure 7:
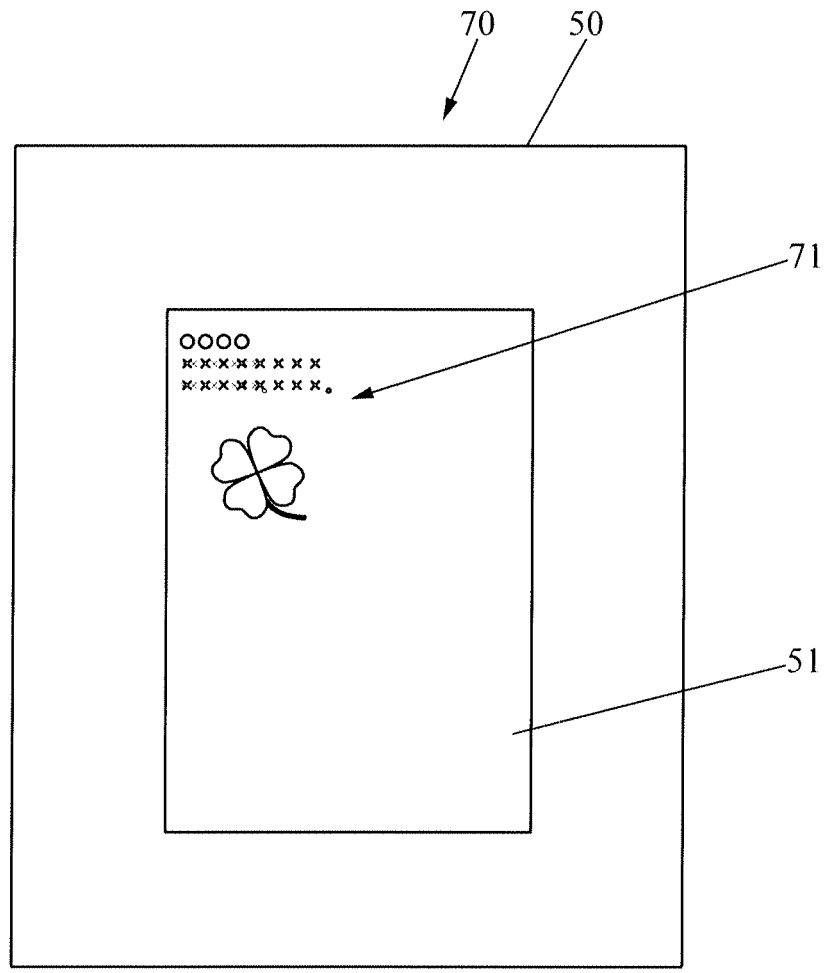
FIG. 7 illustrates another example of the preview image displayed on the display unit illustrated in FIG. 3.

In the preview image 70 illustrated in FIG. 7, the preview of the printing image 71 has a size of ½ of that of the preview image 70 illustrated in FIG. 6. In otherwords, in a state illustrated in FIG. 7, the printing magnification is set to ½.

As illustrated in FIG. 4, when determining in Step S112 that the position of the preview of the printing image with respect to the paper sheet within the scanned image has been changed, the display control unit 46b changes the printing position based on the change in the position of the preview of the printing image (Step S114), and returns to the processing of Step S104 again. In other words, the display control unit 46b displays, for example, such a preview image as illustrated in FIG. 8 on the display unit 42 by the AR technology.

Figure 8:
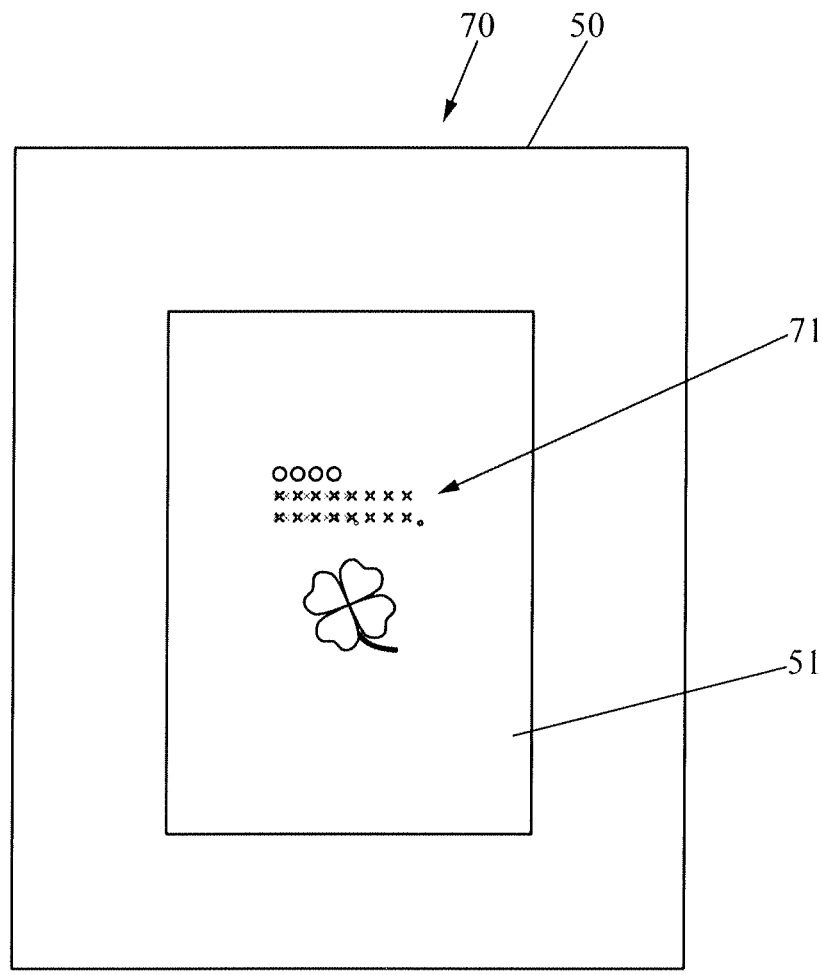
FIG. 8 illustrates another example of the preview image displayed on the display unit illustrated in FIG. 3.

In the preview image 70 illustrated in FIG. 8, the position of the preview of the printing image 71 with respect to the paper sheet 51 within the scanned image 50 differs from that of the preview image 70 illustrated in FIG. 7.

Figure 9:
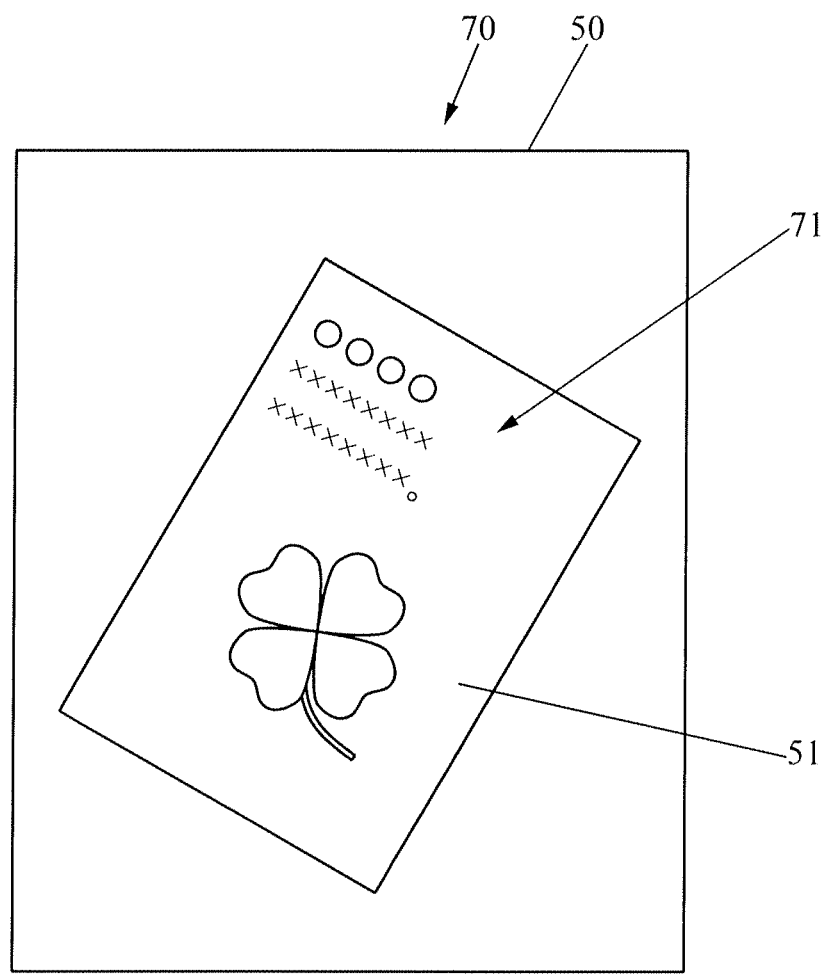
FIG. 9 illustrates another example of the preview image displayed on the display unit illustrated in FIG. 3.

Note that, in the above description, the vertical and horizontal orientations of the paper sheet within the scanned image are the same as the vertical and horizontal orientations of the scanned image, but, as illustrated in FIG. 9, the vertical and horizontal orientations of the paper sheet within the scanned image may differ from the vertical and horizontal orientations of the scanned image.

Figure 10:
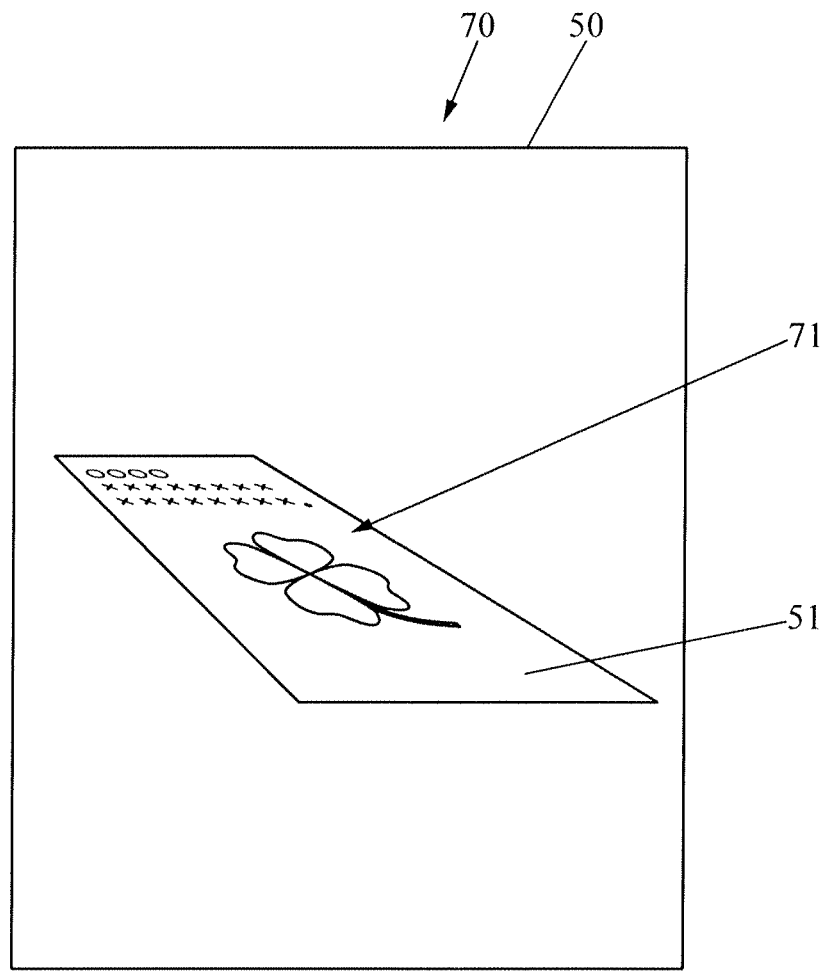
FIG. 10 illustrates another example of the preview image displayed on the display unit illustrated in FIG. 3.

Further, even when a shape of the paper sheet within the scanned image has changed from a rectangle, the display control unit 46b may change the shape of the printing image within the composite image based on the change. For example, even when the shape of the paper sheet within the scanned image has changed to the shape illustrated in FIG. 10, the display control unit 46b can change the shape of the printing image within the composite image based on the shape of the paper sheet within the scanned image as illustrated in FIG. 10. According to this configuration, the mobile device 40 can allow the user to confirm not only the preview image viewed from the front of the paper sheet but also the preview image viewed from various angles with respect to the paper sheet by being changed in a photographing angle of the imaging unit 43 with respect to the paper sheet.

Note that, the above description is directed to the processing performed when the size of the printing image is the same as the size of the paper sheet on which the printing image is to be printed. The display control unit 46b can acquire the size of the printing image from the printing image itself, and can therefore generate, even when the size of the printing image differs from the size of the paper sheet, the preview of the printing image to have a suitable size based on the size of the printing image and the size of the paper sheet in a manner that the size of the paper sheet is specifically designated through the operation unit 41.

Next, a description is made of an operation of the image forming system 10 performed when the MFP is used for printing the printing image.

When being instructed to perform printing on the paper sheet based on the preview image displayed on the display unit 42 through the operation unit 41, the control unit 46 of the mobile device 40 transmits the printing image acquired in Step S101 to the MFP received in Step S102 along with the printing magnification and the printing position through the network communication unit 44.

Therefore, the control unit of the MFP prints the printing image transmitted from the mobile device 40 on the paper sheet by a printer by using the printing magnification and the printing position transmitted from the mobile device 40 along with the printing image.

As described above, the mobile device 40 displays the composite image that combines the printing image on the paper sheet within the image scanned by the imaging unit 43, on the display unit 42 as the preview image (Step S110), and hence an appearance of actual paper sheet can be reflected on the preview image, with the result that the preview image similar to an actual resulting printed image can be generated.

The mobile device 40 recognizes the paper sheet itself within the scanned image by the image recognition technology, to thereby recognize that the paper sheet is included in the scanned image (Step S104), and hence the composite image that combines the printing image on the paper sheet within the scanned image, can be displayed on the display unit 42 as the preview image even when a special marker used for recognizing that the paper sheet is included in the scanned image is not formed on the paper sheet.

Note that, the mobile device 40 may be configured to recognize that the paper sheet is included in the scanned image by reading the special marker used for recognizing that the paper sheet is included in the scanned image from above the paper sheet.

The mobile device 40 changes the appearance of the printing image within the composite image based on the output characteristic of the MFP by receiving the designation of the MFP that is to print the printing image on the paper sheet, and hence the preview image suitable for the MFP used for printing the printing image can be easily displayed on the display device.

Note that, the image forming system 10 includes a mobile device as the electronic device according to the embodiment of the present disclosure, but may include another electronic device such as a PC or the like instead of the mobile device.

Further, the image forming system 10 includes an MFP as the image forming apparatus according to the embodiment of the present disclosure, but the image forming system 10 may include another image forming apparatus such as a dedicated printer, a dedicated copier, a dedicated facsimile device, or the like instead of the MFP.

Now, another embodiment of the present disclosure is described with reference to the accompanying drawings.

Figure 11:
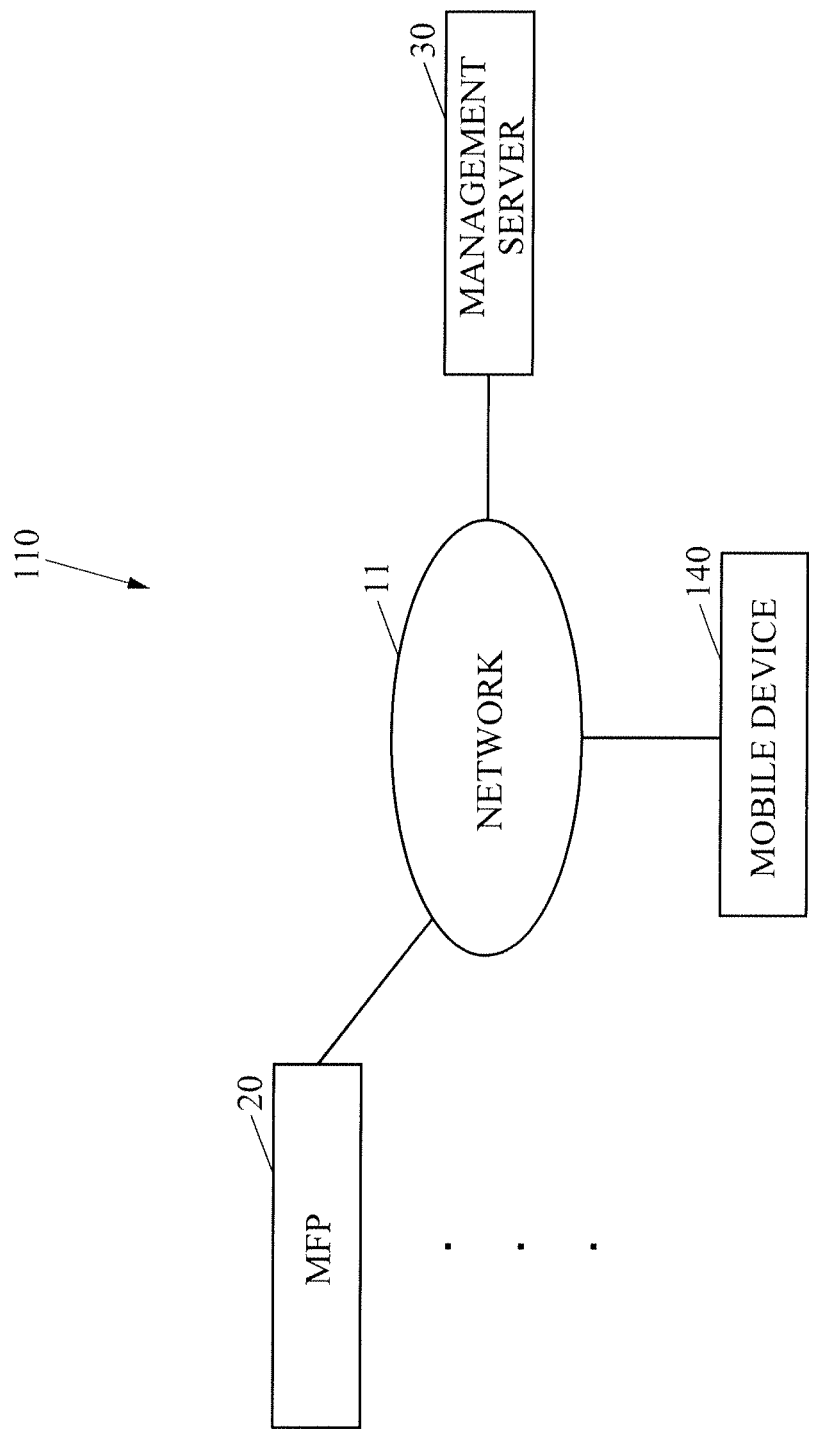
FIG. 11 illustrates a configuration of an image forming system according to another embodiment of the present disclosure.

FIG. 11 illustrates a configuration of an image forming system 110 according to the embodiment.

As illustrated in FIG. 11, the image forming system. 110 includes a plurality of multifunction peripherals (MFPs) including a MFP 20, a management server 30 such as a personal computer (PC) that manages the plurality of MFPs, and a mobile device 140 such as a smartphone. The plurality of MFPs, the management server 30, and the mobile device 140 of the image forming system 110 are communicably connected to one another through a network 11 such as a local area network (LAN) or the Internet. The mobile device 140 constitutes an electronic device according to the present disclosure.

As described above, the MFP 20 has the configuration illustrated in FIG. 2. The configuration of each of the plurality of MFPs of the image forming system 110 is the same as the configuration of the MFP 20. Therefore, the MFP 20 is described below as a representative of the plurality of MFPs of the image forming system 110.

Figure 12:
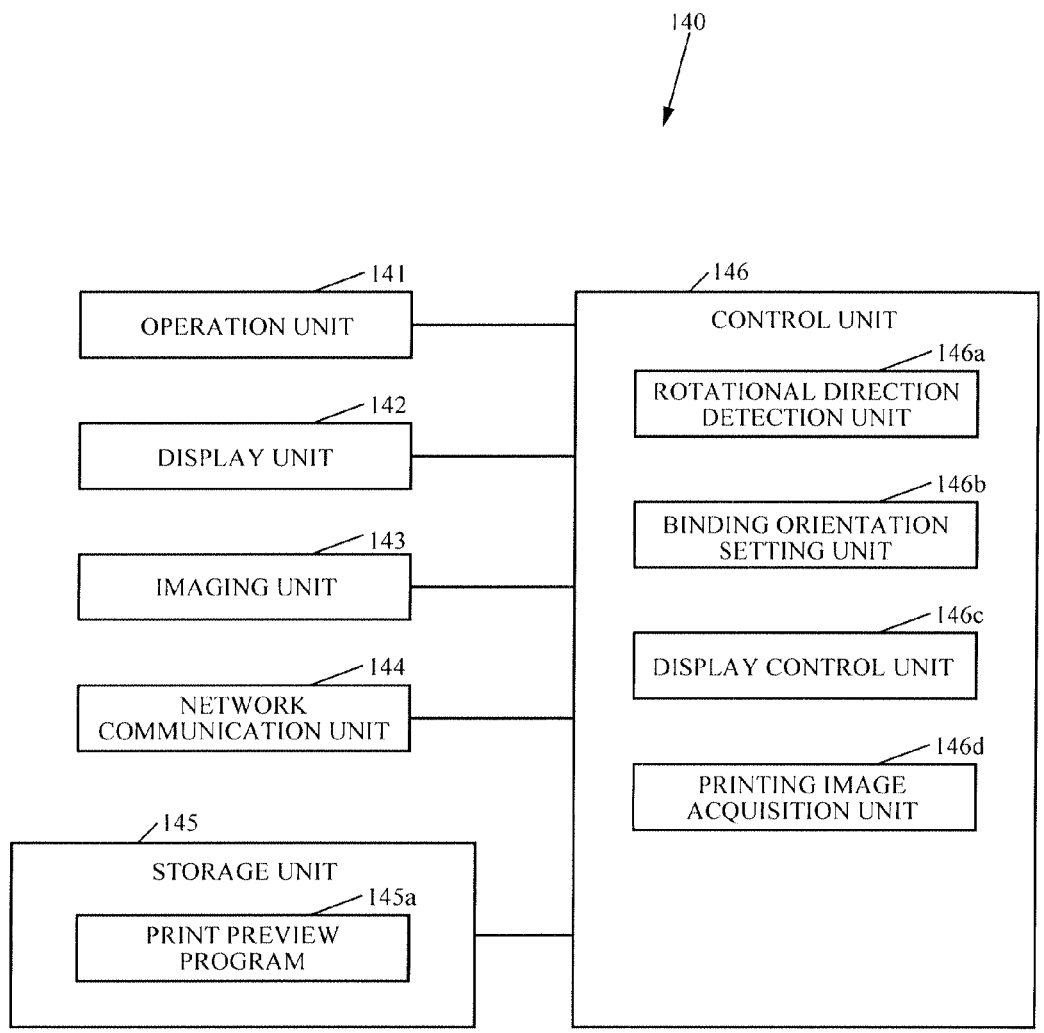
FIG. 12 illustrates a configuration of a mobile device illustrated in FIG. 11.

FIG. 12 illustrates a configuration of the mobile device 140.

As illustrated in FIG. 12, the mobile device 140 includes an operation unit 141 serving as an input device with, for example, buttons through which various operations are input, a display unit 142 serving as a display device such as an LCD that displays various kinds of information, an imaging unit 143 serving as an imaging device that photographs a still image or a moving image, a network communication unit 144 that communicates to and/or from an external apparatus through the network 11 illustrated in FIG. 11, a storage unit 145 including a nonvolatile storage device such as an HDD that stores programs and various kinds of data, and a control unit 146 that controls the entire mobile device 140.

The operation unit 141 may include an input device including a touch panel together with the display unit 142.

The storage unit 145 stores a print preview program 145a executed by the control unit 146. The print preview program 145a may be installed on the mobile device 140 at a manufacturing stage of the mobile device 140, may be installed on the mobile device 140 additionally from a storage medium such as a universal serial bus (USB) memory, or may be installed on the mobile device 140 additionally through the network 11.

The control unit 146 includes, for example, a CPU, a ROM that stores programs and various kinds of data, and a RAM used as a work area for the CPU. The CPU executes a program stored in the ROM or the storage unit 145.

The control unit 146 executes the print preview program 145a stored in the storage unit 145, to thereby function as a rotational direction detection unit 146a, a binding orientation setting unit 146b, a display control unit 146c, and a printing image acquisition unit 146d. The rotational direction detection unit 146a detects, when the paper sheet is turned over, a rotational direction of the turning-over with respect to the paper sheet. The binding orientation setting unit 146b sets a binding orientation for double-sided printing performed on the MFP. The display control unit 146c displays the image scanned by the imaging unit 143 on the display unit 142. The printing image acquisition unit 146d acquires the printing image to be printed by the MFP.

Next, a description is made of an operation of the image forming system 110.

First, a description is made of the operation of the image forming system 110 performed when the binding orientation is set for the double-sided printing by reading images from a plurality of pages of original documents.

In response to an instruction issued through the operation unit 21, the control unit 28 of the MFP 20 reads images from a plurality of pages of original documents by the scanner 23 to generate a plurality of pages of printing images, and transmits the generated plurality of pages of printing images to the management server 30 through the network communication unit 26.

Therefore, the management server 30 receives and stores the plurality of pages of printing images transmitted from the MFP 20.

Next, a description is made of an operation of the mobile device 140 performed when the binding orientation is set for the double-sided printing performed on the MFP.

Figure 13:
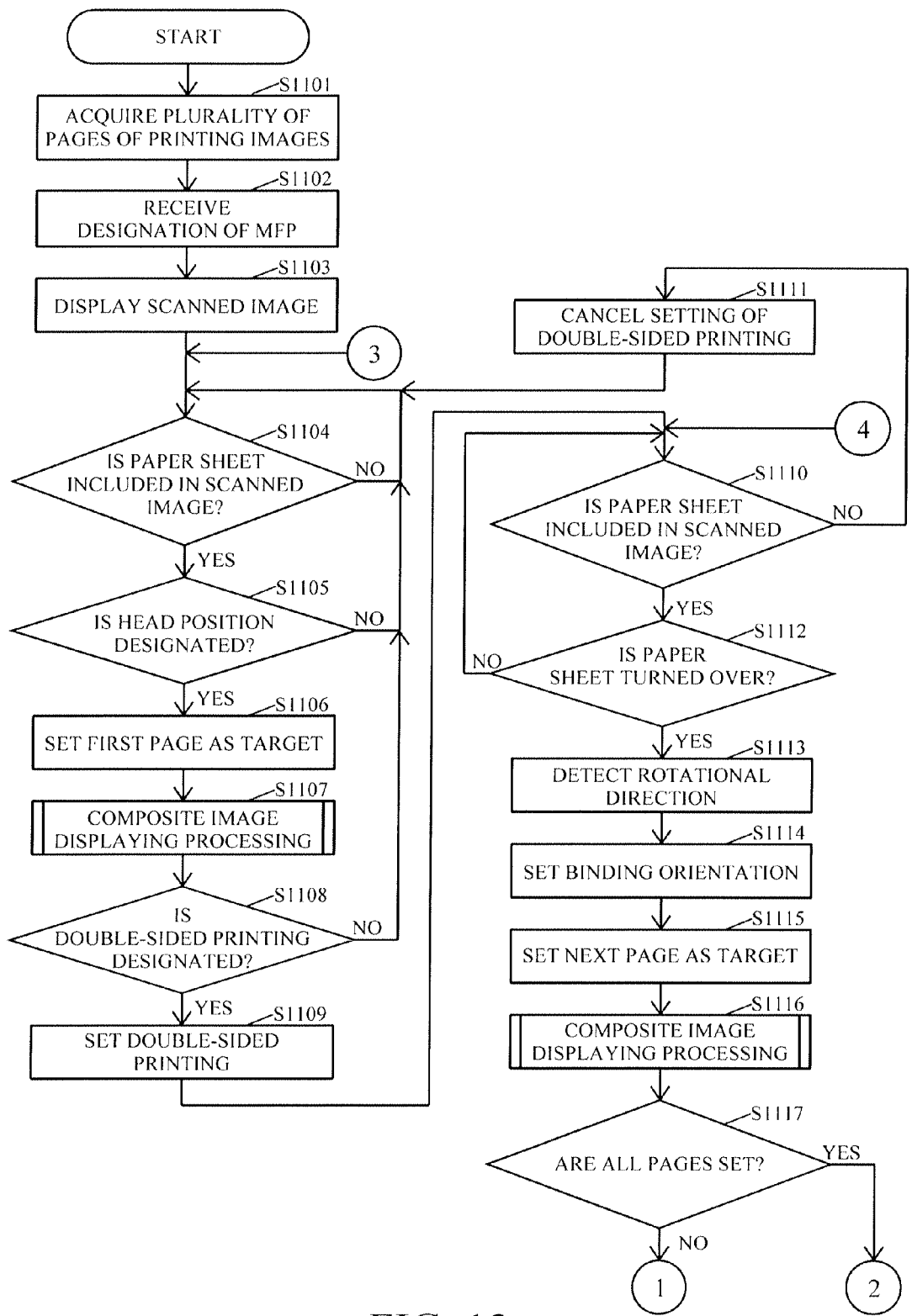
FIG. 13 illustrates an operation of the mobile device illustrated in FIG. 12 performed when a binding orientation is set for double-sided printing performed on the MFP.
Figure 14:
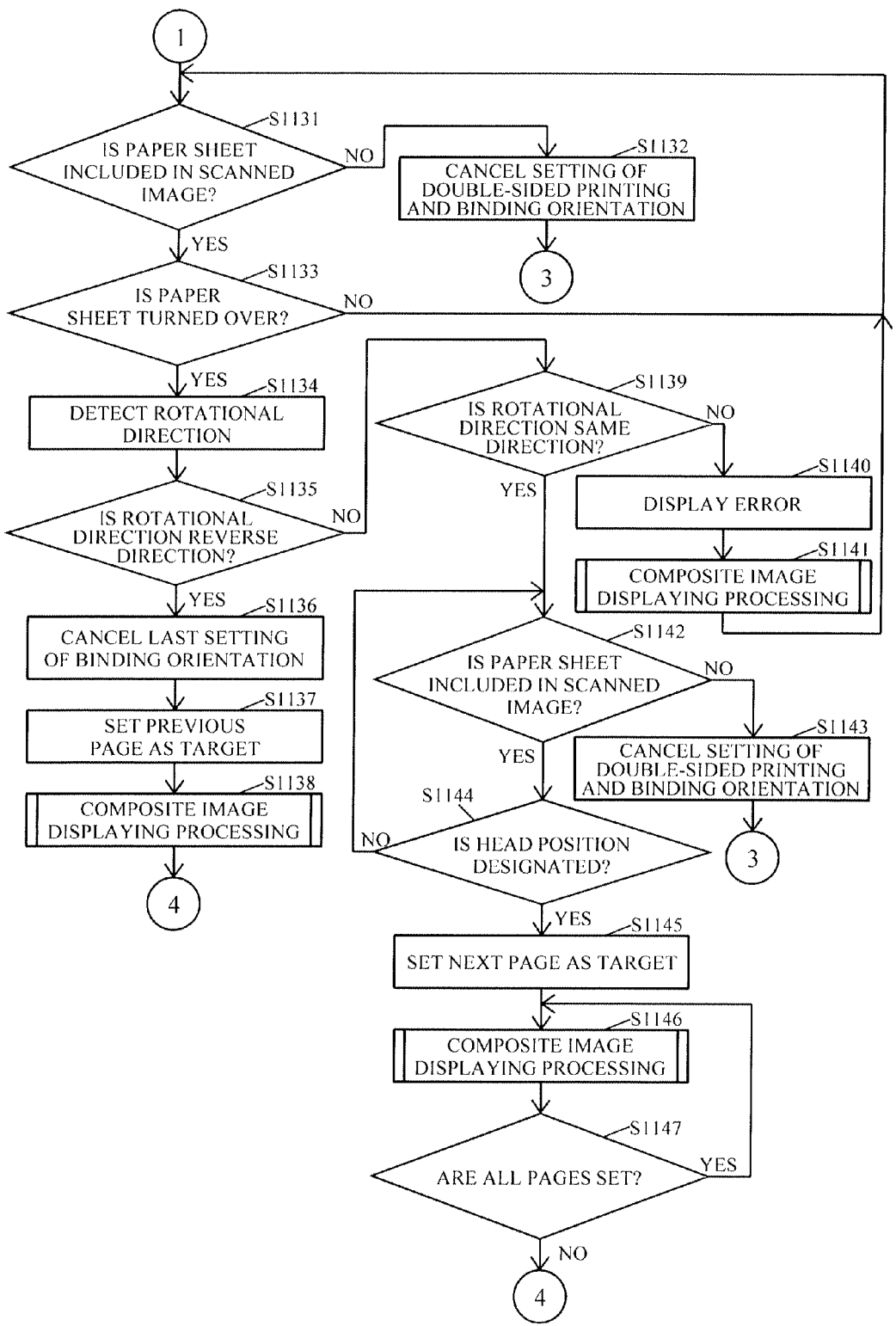
FIG. 14 illustrates an operation continued from FIG. 13.
Figure 15:
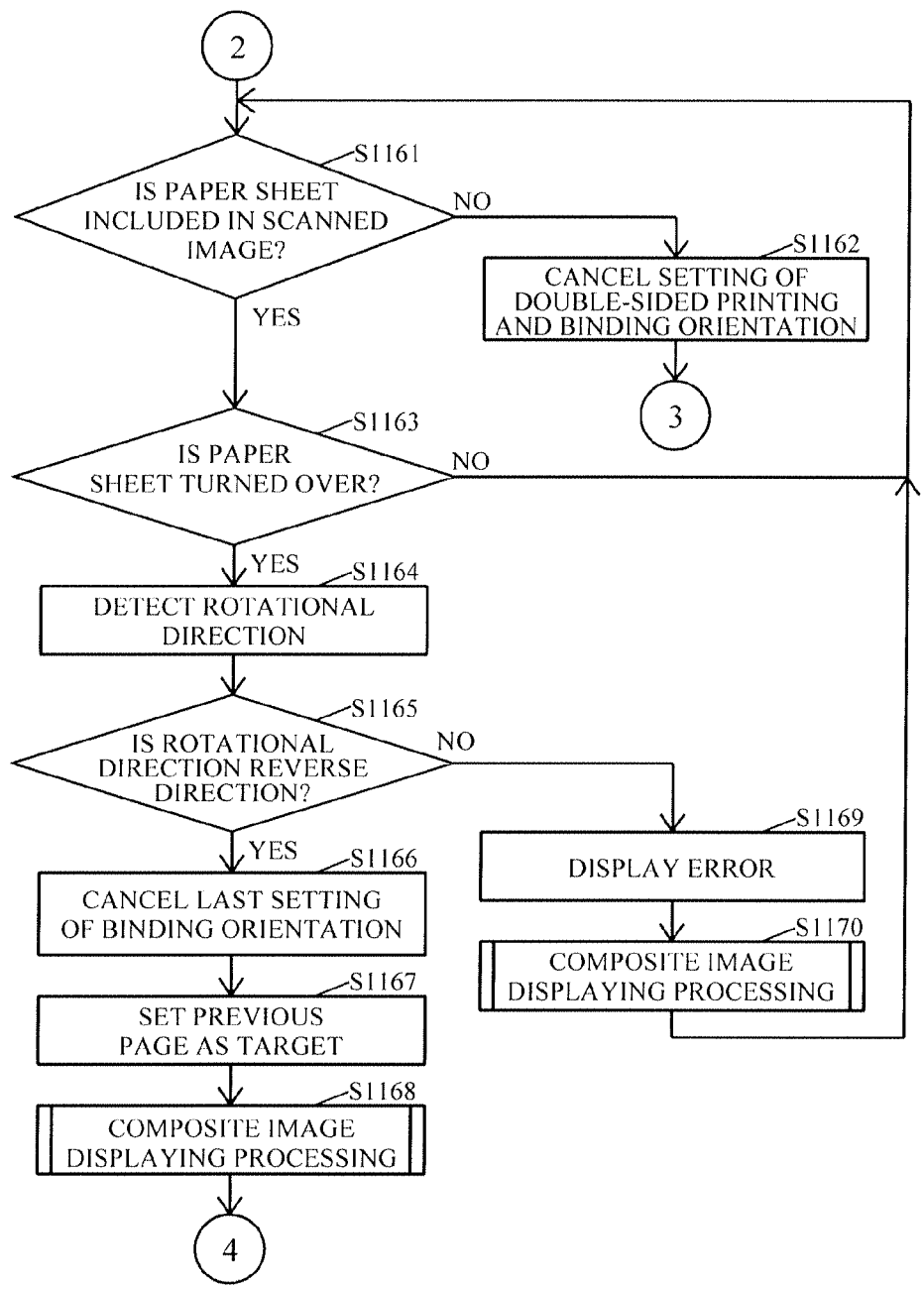
FIG. 15 illustrates another operation continued from FIG. 13.

The user of the mobile device 140 may activate the print preview program 145a when it is desired to set the binding orientation for the double-sided printing performed on the MFP, to thereby cause the control unit 146 of the mobile device 140 to execute operations illustrated in FIG. 13 to FIG. 15.

FIG. 13 illustrates an operation of the mobile device 140 performed when the binding orientation is set for the double-sided printing performed on the MFP. FIG. 14 illustrates an operation of the mobile device 140 continued from FIG. 13. FIG. 15 illustrates an operation of the mobile device 140 continued from FIG. 13 that is different from the operation illustrated in FIG. 14.

As illustrated in FIG. 13 to FIG. 15, the printing image acquisition unit 146d of the mobile device 140 acquires a plurality of pages of printing images to be printed on the paper sheet by the MFP through the network communication unit 144 (Step S1101). Here, the printing image acquisition unit 146d may acquire from the management server 30 a plurality of pages of printing images generated from a plurality of pages of original documents by the MFP and stored by the management server 30, or may acquire a plurality of pages of printing images of another kind. For example, the printing image acquisition unit 146d may acquire a plurality of pages of printing images generated from a plurality of pages of original documents by the MFP 20 and transmitted directly from the MFP 20 to the mobile device 140, or may acquire a plurality of pages of printing images generated by the PC (not shown) and transmitted to the mobile device 140.

Subsequently, the control unit 146 of the mobile device 140 displays on the display unit 142 the MFP designation screen used for receiving the designation of the MFP to be used for printing the printing images, to thereby receive the designation of the MFP through the operation unit 141 (Step S1102).

Subsequently, the display control unit 146c of the mobile device 140 displays the image scanned by the imaging unit 143 on the display unit 142 (Step S1103).

Subsequently, the display control unit 146c determines whether or not the paper sheet is included in the scanned image until the display control unit 146b determines that the paper sheet is included in the scanned image (Step S1104). Here, the display control unit 146c recognizes the paper sheet itself within the scanned image by the image recognition technology, to thereby recognize that the paper sheet is included in the scanned image. Note that, the user of the mobile device 140 can include the paper sheet in the scanned image by adjusting the position and the orientation of the mobile device 140 so that the paper sheet is included in the scanned image displayed on the display unit 142.

When the display control unit 146b determines in Step S1104 that the paper sheet is included in the scanned image, the display control unit 146c determines whether or not the head position of the paper sheet within the scanned image has been designated (Step S1105). The user of the mobile device 140 can designate the head position by setting the head position of the paper sheet within such a scanned image as illustrated in FIG. 5 displayed on the display unit 142 through the operation unit 141.

As illustrated in FIG. 13 to FIG. 15, the display control unit 146c executes the processing of Step S1104 when determining in Step S1105 that the head position has not been designated.

When the display control unit 146b determines in Step S1105 that the head position has been designated, the display control unit 146c sets, as a target, the printing image on the first page among the plurality of pages of printing images acquired in Step S1101 (Step S1106).

Subsequently, the display control unit 146c executes composite image displaying processing illustrated in FIG. 16 (Step S1107).

Figure 16:
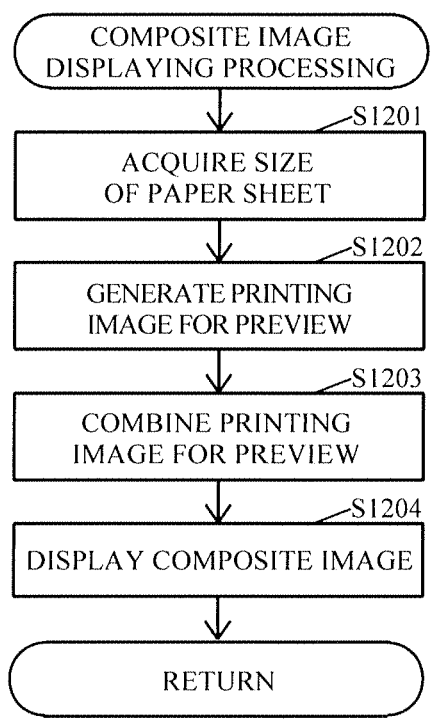
FIG. 16 illustrates composite image displaying processing in the operations illustrated in FIG. 13 to FIG. 15.

FIG. 16 illustrates the composite image displaying processing included in the operations illustrated in FIG. 13 to FIG. 15.

As illustrated in FIG. 16, the display control unit 146c acquires the size of the paper sheet within the scanned image with reference to the designated head position (Step S1201).

Specifically, the display control unit 146c acquires the vertical length (length of the left side or the right side of the paper sheet when viewed with the head position placed at the top) of the paper sheet within the scanned image and the horizontal length (length of the top side or the bottom side when viewed with the head position placed at the top) of the paper sheet within the scanned image.

Subsequently, the display control unit 146c generates a printing image for a preview image (hereinafter referred to as "preview of the printing image") with the size acquired in Step S1201 for the printing image of a target page based on the printing image of the target page and the size acquired in Step S1201 (Step S1202). Here, the display control unit 146c changes the appearance of the preview of the printing image based on the output characteristic of the MFP received in Step S1102. For example, when the MFP received in Step S1102 is a dedicated monochrome machine, the display control unit 146c changes the preview of the printing image to a monochrome image. Further, even when the MFP received in Step S1102 is a color machine, the display control unit 146c may change the preview of the printing image based on the color reproducibility of the MFP.

Subsequently, the display control unit 146c generates a composite image that combines the preview of the printing image generated in Step S1202 with the scanned image (Step S1203). At this time, the display control unit 146c generates the composite image by combining the preview of the printing image in a specific position in the paper sheet within the scanned image. Here, the specific position in the paper sheet within the scanned image corresponds to a position of a reference point for placement of the printing image with respect to the paper sheet used when the printing image is printed on the paper sheet. The position of the reference point for the placement of the printing image with respect to the paper sheet is, for example, the position of the left end of the top edge of the paper sheet when viewed with the head position placed at the top. At this time, the specific position in the paper sheet within the scanned image is the position of the left end of the top edge of the paper sheet within the scanned image when viewed with the head position placed at the top.

Subsequently, the display control unit 146c displays the composite image generated in Step S1203. In other words, the display control unit 146c displays the preview image on the display unit 142 (Step S1204) and brings the composite image displaying processing illustrated in FIG. 16 to an end. In other words, for example, the display control unit 146c displays such a preview image as illustrated in FIG. 17 on the display unit 142 by the AR technology.

Figure 17:
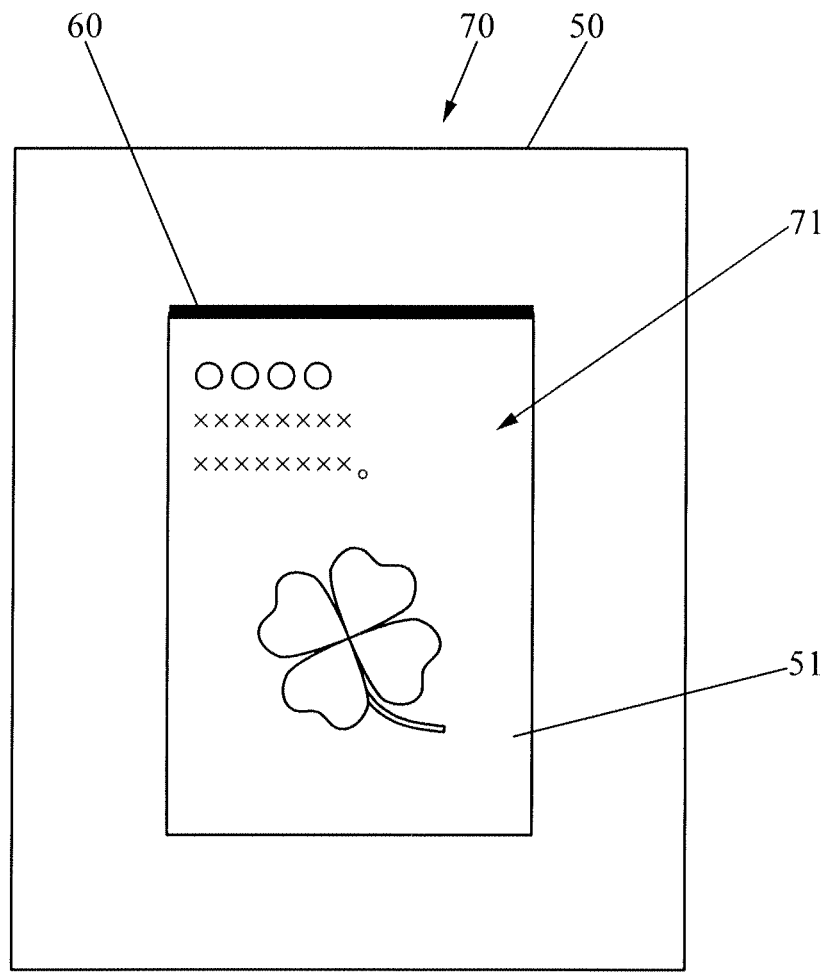
FIG. 17 illustrates an example of a preview image displayed on a display unit illustrated in FIG. 12.

The preview image 70 illustrated in FIG. 17 is the composite image that combines the preview of the printing image 71 with the scanned image 50. The preview image 70 is an example of the composite image generated by combining the preview of the printing image 71 with the scanned image 50 with the left end of the top edge of the preview of the printing image 71 coinciding with the left end of the top edge of the paper sheet 51 within the scanned image 50 when viewed with the head position 60 placed at the top in a case where the position of the reference point for the placement of the printing image with respect to the paper sheet is the left end of the top edge of the paper sheet.

Figure 18:
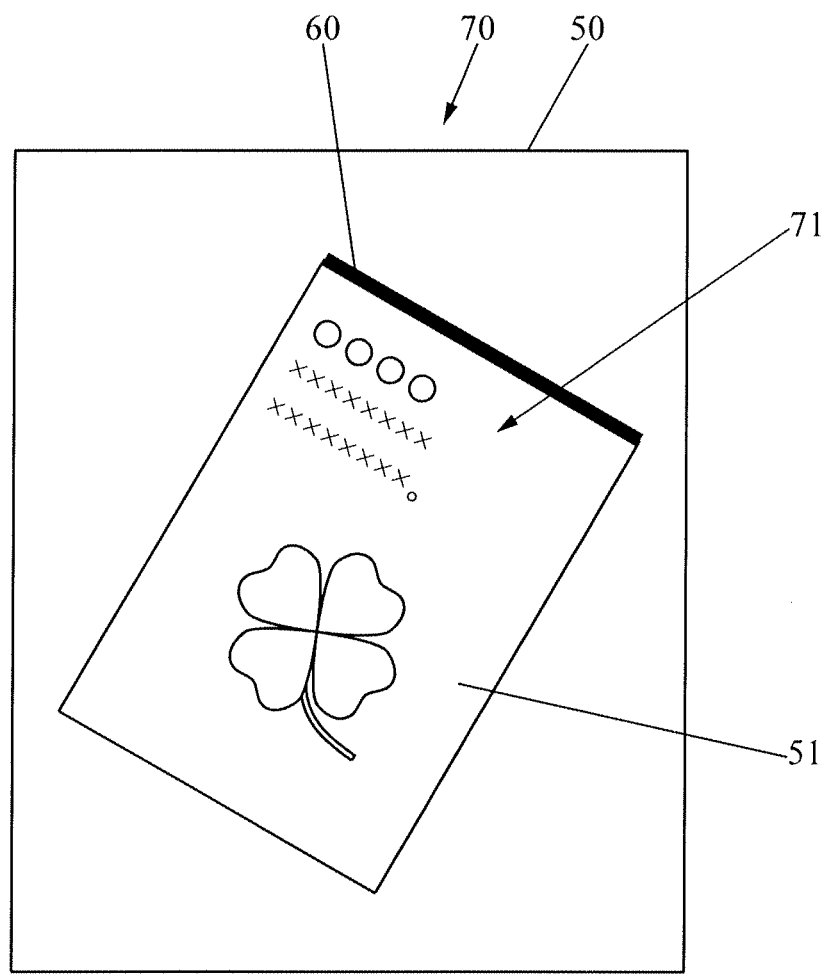
FIG. 18 illustrates another example of the preview image displayed on the display unit illustrated in FIG. 12.

In the above description, the vertical and horizontal orientations of the paper sheet 51 within the scanned image 50 are the same as the vertical and horizontal orientations of the scanned image 50, but, as illustrated in FIG. 18, the vertical and horizontal orientations of the paper sheet 51 within the scanned image 50 may differ from the vertical and horizontal orientations of the scanned image 50. Even at this time, the display control unit 146c acquires the vertical and horizontal sizes of the paper sheet 51 within the scanned image 50 with reference to the designated head position 60, and generates the composite image by combining the preview of the printing image 71 in the specific position in the paper sheet 51 within the scanned image 50.

Figure 19:
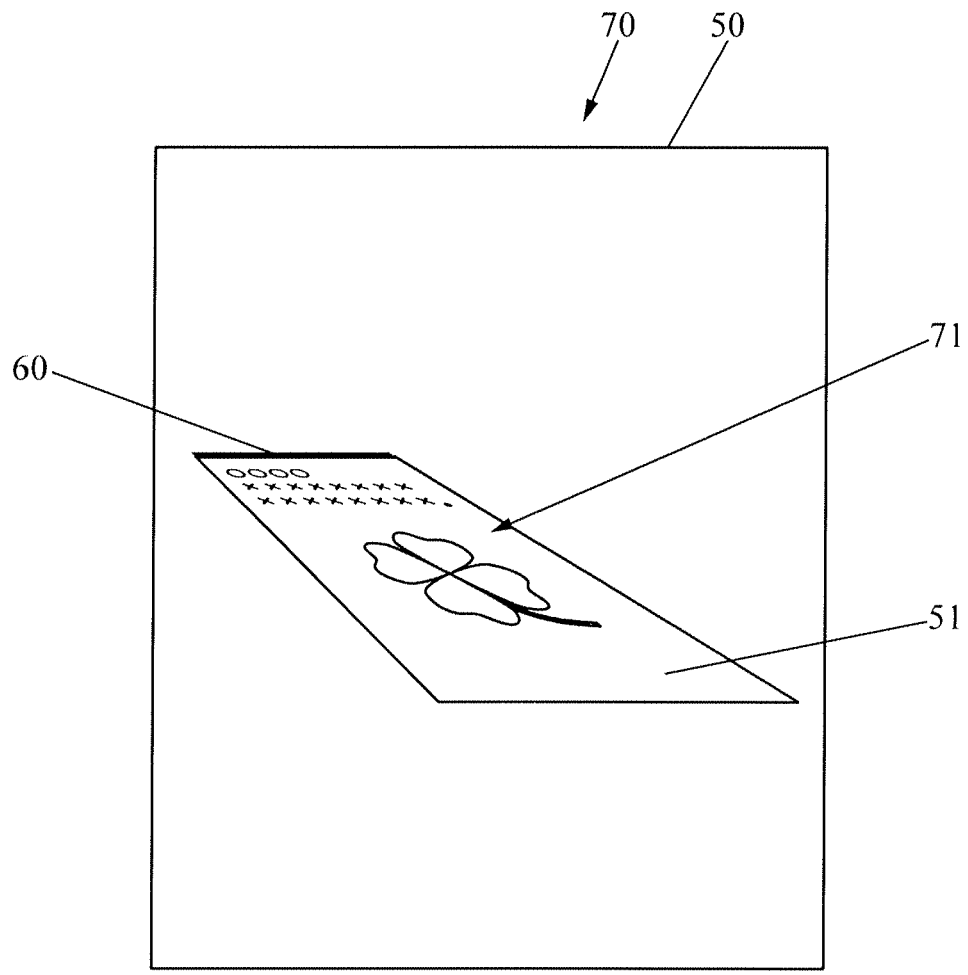
FIG. 19 illustrates another example of the preview image displayed on the display unit illustrated in FIG. 12.

Further, even when the shape of the paper sheet 51 within the scanned image 50 has changed from a rectangle due to an influence of the photographing position, the display control unit 146c may change the shape of the preview of the printing image within the composite image based on the change. For example, even when the shape of the paper sheet 51 within the scanned image 50 has changed to the shape illustrated in FIG. 19, the display control unit 146c can change the shape of the preview of the printing image within the composite image based on the shape of the paper sheet 51 within the scanned image 50 as illustrated in FIG. 19. At this time, the display control unit 146c acquires the lengths of the top side, the bottom side, the left side, and the right side of the paper sheet 51 within the scanned image 50 when viewed with the head position 60 placed at the top in Step S1201 illustrated in FIG. 16, and changes the shape of the preview of the printing image 71 based on a ratio of the lengths of the respective sides.

According to this configuration, the mobile device 140 can allow the user to confirm not only the preview image 70 viewed from the front of the paper sheet but also the preview image 70 viewed from various angles with respect to the paper sheet by being changed in the photographing angle of the imaging unit 143 with respect to the paper sheet.

Note that, the above description is directed to the processing performed when the size of the printing image is the same as the size of the paper sheet on which the printing image is to be printed. The display control unit 146c can acquire the size of the printing image from the printing image itself. Accordingly, even when the size of the printing image differs from the size of the paper sheet, the display control unit 146c can generate the preview of the printing image to have a suitable size based on the size of the printing image and the size of the paper sheet in a manner that the size of the paper sheet is specifically designated through the operation unit 141.

As illustrated in FIG. 13 to FIG. 15, the control unit 146 determines whether or not the double-sided printing has been designated after the processing of Step S1107 (Step S1108). The user of the mobile device 140 can designate the double-sided printing through the operation unit 141.

When the control unit 146 determines in Step S1108 that the double-sided printing has not been designated, the control unit 146 executes the processing of Step S1104.

When the control unit 146 determines in Step S1108 that the double-sided printing has been designated, the control unit 146 sets the double-sided printing (Step S1109).

Subsequently, the display control unit 146c determines whether or not the paper sheet is included in the image scanned by the imaging unit 143 (Step S1110).

When the control unit 146 determines in Step S1110 that the paper sheet is not included in the scanned image, the control unit 146 cancels the setting of the double-sided printing (Step S1111).

Subsequently, the display control unit 146c executes the processing of Step S1104.

When the rotational direction detection unit 146a of the control unit 146 determines in Step S1110 that the paper sheet is included in the scanned image, the rotational direction detection unit 146a determines whether or not the paper sheet included in the scanned image has been turned over based on image processing for the scanned image (Step S1112). The user of the mobile device 140 can, for example, turn over the paper sheet by manually reversing the paper sheet with his/her hand.

When the rotational direction detection unit 146*a* determines in Step S1112 that the paper sheet has not been turned over, the display control unit 146*c* executes the processing of Step S1110.

When the rotational direction detection unit 146*a* determines in Step S1112 that the paper sheet has been turned over, the rotational direction detection unit 146*a* detects the rotational direction of the turning-over with respect to the paper sheet included in the scanned image based on the image processing for the scanned image (Step S1113).

Subsequently, the binding orientation setting unit 146*b* of the control unit 146 sets the binding orientation for the double-sided printing performed on the MFP based on the rotational direction detected in Step S1113 (Step S1114). For example, the binding orientation setting unit 146*b* (i) sets the binding orientation to "top bind" when the rotational direction detected in Step S1113 is a rotational direction for turning over the paper sheet about a top edge of the paper sheet, (ii) sets the binding orientation to "bottom bind" when the rotational direction detected in Step S1113 is a rotational direction for turning over the paper sheet about a bottom edge of the paper sheet, (iii) sets the binding orientation to "left bind" when the rotational direction detected in Step S1113 is a rotational direction for turning over the paper sheet about a left edge of the paper sheet, and (iv) sets the binding orientation to "right bind" when the rotational direction detected in Step S1113 is a rotational direction for turning over the paper sheet about a right edge of the paper sheet.

Subsequently, the display control unit 146*c* sets as the target the printing image on the page next to the current target page among the plurality of pages of printing images acquired in Step S1101 (Step S1115).

Subsequently, the display control unit 146*c* executes the composite image displaying processing illustrated in FIG. 16 (Step S1116).

Figure 20A:
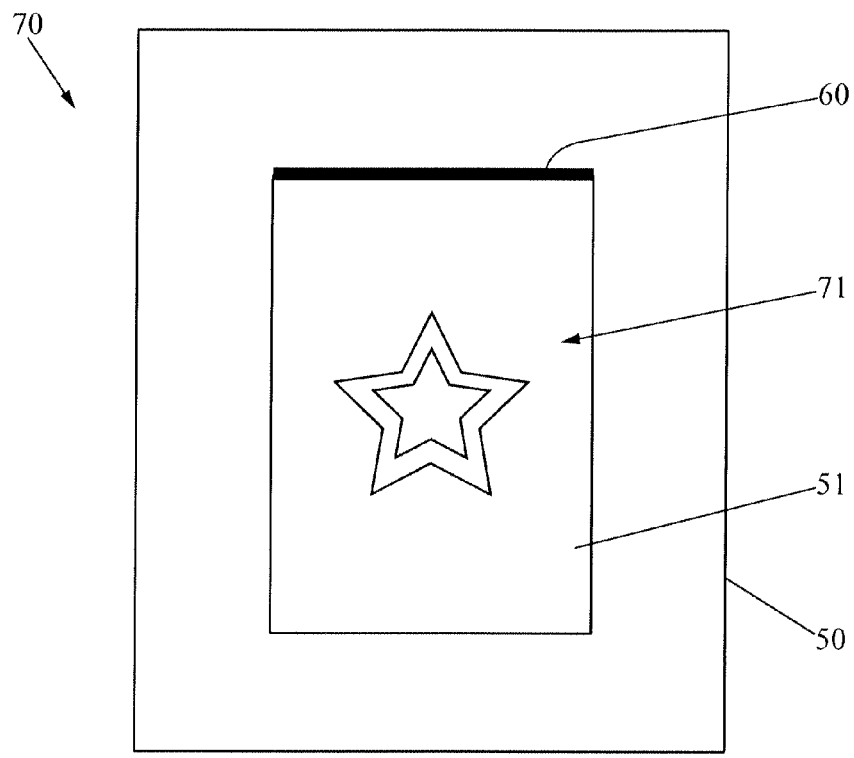
FIG. 20A illustrates an example of the preview image displayed on the display unit when the binding orientation is set to "left bind".
Figure 20B:
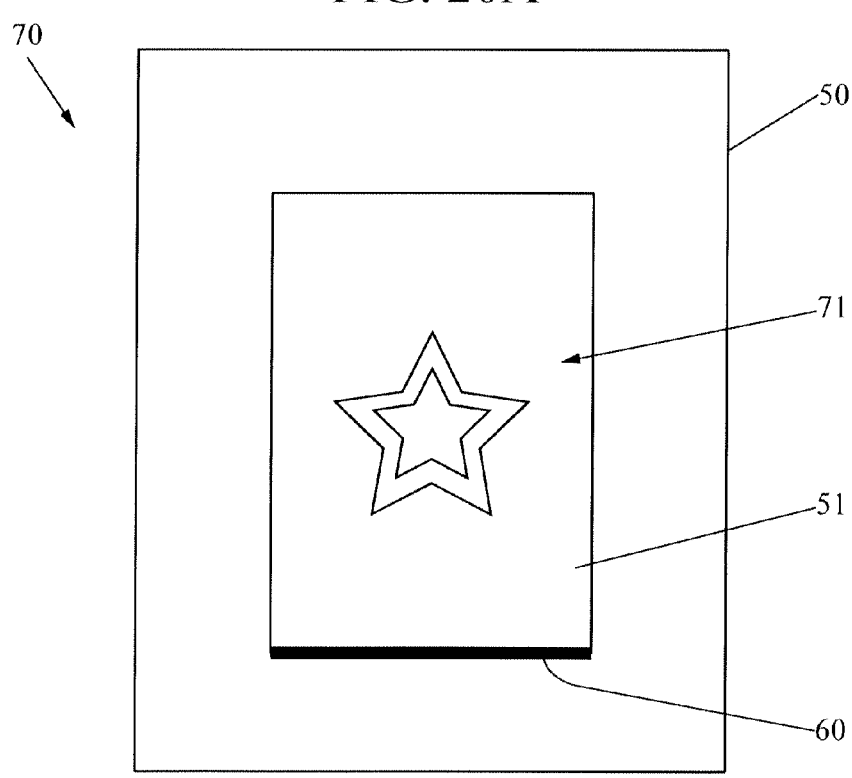
FIG. 20B illustrates an example of the preview image displayed on the display unit when the binding orientation is set to "top bind".

The preview image 70 displayed on the display unit 142 in Step S1116 is, for example, an image illustrated in FIG. 20A and FIG. 20B. FIG. 20A illustrates an example of the preview image 70 of the next page obtained when the binding orientation is set to "left bind". As illustrated in FIG. 20A, the preview of the printing image 71 is displayed by being combined with the paper sheet 51 within the scanned image 50 when viewed with the head position 60 placed at the top. At this time, an apparent binding position is the right edge of the paper sheet 51. FIG. 20B illustrates an example of the preview image 70 of the next page obtained when the binding orientation is set to "top bind". As illustrated in FIG. 20B, the preview of the printing image 71 is displayed by being combined with the paper sheet 51 within the scanned image 50 when viewed with the head position 60 of the previous page placed at the bottom. The head position 60 of the previous page is displayed at the top of the paper sheet 51 in the preview image of the previous page, but after the actual paper sheet is turned over about the top edge, displayed at the bottom of the paper sheet 51 in the preview image 70 of the next page. In FIG. 20B, the apparent binding position is the bottom edge of the paper sheet 51. The head position 60 illustrated in each of FIG. 20A and FIG. 20B is the designated head position, and is the head position of the previous page.

As illustrated in FIG. 13 to FIG. 15, the control unit 146 determines after Step S1116 whether or not all the plurality of pages of printing images acquired in Step S1101 have been set as the target (Step S1117).

When the control unit 146 determines in Step S1117 that not all the pages have been set as the target, in other words, when there exists a page that has not yet been set as the target, the display control unit 146*c* determines whether or not the paper sheet is included in the image scanned by the imaging unit 143 (Step S1131).

When the display control unit 146*c* determines in Step S1131 that the paper sheet is not included in the scanned image, the binding orientation setting unit 146*b* cancels the setting of the double-sided printing and the setting of the binding orientation (Step S1132).

Subsequently, the display control unit 146*c* executes the processing of Step S1104.

When the display control unit 146*c* determines in Step S1131 that the paper sheet is included in the scanned image, the rotational direction detection unit 146*a* determines whether or not the paper sheet included in the scanned image has been turned over in the same manner as in the processing of Step S1112 (Step S1133).

When the rotational direction detection unit 146*a* determines in Step S1133 that the paper sheet has not been turned over, the display control unit 146*c* executes the processing of Step S1131.

When the rotational direction detection unit 146*a* determines in Step S1133 that the paper sheet has been turned over, the rotational direction detection unit 146*a* detects the rotational direction of the turning-over with respect to the paper sheet included in the scanned image in the same manner as in the processing of Step S1113 (Step S1134).

Subsequently, the binding orientation setting unit 146*b* determines whether or not the rotational direction detected in Step S1134 for the target page is a reverse direction to the rotational direction detected in Step S1113 for the previous page (Step S1135).

When the binding orientation setting unit 146*b* determines in Step S1135 that the rotational direction detected for the target page is the reverse direction to the rotational direction detected for the previous page, the binding orientation setting unit 146*b* cancels the setting of the binding orientation set in the immediately previous Step S1114 (Step S1136).

Subsequently, the display control unit 146*c* sets as the target the printing image on the page previous to the current target page among the plurality of pages of printing images acquired in Step S1101 (Step S1137), and executes the composite image displaying processing illustrated in FIG. 8 (Step S1138).

Subsequently, the display control unit 146*c* executes the processing of Step S1110.

When the binding orientation setting unit 146*b* determines in Step S1135 that the rotational direction detected for the target page is not the reverse direction to the rotational direction detected for the previous page, the binding orientation setting unit 146*b* determines whether or not the rotational direction detected in Step S1134 for the target page is the same direction as the rotational direction detected in Step S1113 for the previous page (Step S1139).

When the binding orientation setting unit 146*b* determines in Step S1139 that the rotational direction detected for the target page is not the same direction as the rotational direction detected for the previous page, the display control unit 146*c*, then executes the composite image displaying processing illustrated in FIG. 16 (Step S1141), and executes the processing of Step S1131.

When the binding orientation setting unit 146*b* determines in Step S1139 that the rotational direction detected for the target page is the same direction as the rotational direction detected for the previous page, the display control unit 146*c* determines whether or not the paper sheet is included in the image scanned by the imaging unit 143 (Step S1142).

When the display control unit 146c determines in Step S1142 that the paper sheet is not included in the scanned image, the binding orientation setting unit 146b cancels the setting of the double-sided printing and the setting of the binding orientation (Step S1143).

Subsequently, the display control unit 146c executes the processing of Step S1104.

When the display control unit 146c determines in Step S1142 that the paper sheet is included in the scanned image, the display control unit 146c determines whether or not the head position has been designated (Step S1144). The user of the mobile device 140 can designate the head position by setting the head position of the paper sheet within the scanned image displayed on the display unit 142 through the operation unit 141.

When the display control unit 146c determines in Step S1144 that the head position has not been designated, the display control unit 146c executes the processing of Step S1142.

When the display control unit 146c determines in Step S1144 that the head position has been designated, the display control unit 146c sets as the target the printing image on the page next to the current target page among the plurality of pages of printing images acquired in Step S1101 (Step S1145), and executes the composite image displaying processing illustrated in FIG. 16 (Step S1146).

Subsequently, the control unit 146 determines whether or not all the plurality of pages of printing images acquired in Step S1101 have been set as the target (Step S1147).

When the control unit 146 determines in Step S1147 that all the pages have been set as the target, the display control unit 146c executes the processing of Step S1146.

When the control unit 146 determines in Step S1147 that not all the pages have been set as the target, in other words, when there exists a page that has not yet been set as the target, the display control unit 146c executes the processing of Step S1110.

When the control unit 146 determines in Step S1117 that all the pages have been set as the target, the display control unit 146c determines whether or not the paper sheet is included in the image scanned by the imaging unit 143 (Step S1161).

When the display control unit 146c determines in Step S1161 that the paper sheet is not included in the scanned image, the binding orientation setting unit 146b cancels the setting of the double-sided printing and the setting of the binding orientation (Step S1162).

Subsequently, the display control unit 146c executes the processing of Step S1104.

When the display control unit 146c determines in Step S1161 that the paper sheet is included in the scanned image, the rotational direction detection unit 146a determines whether or not the paper sheet included in the scanned image has been turned over in the same manner as in the processing of Step S1112 (Step S1163).

When the rotational direction detection unit 146a determines in Step S1163 that the paper sheet has not been turned over, the display control unit 146c executes the processing of Step S1161.

When the rotational direction detection unit 146a determines in Step S1163 that the paper sheet has been turned over, the rotational direction detection unit 146a detects the rotational direction of the turning-over with respect to the paper sheet included in the scanned image in the same manner as in the processing of Step S1113 (Step S1164).

Subsequently, the binding orientation setting unit 146b determines whether or not the rotational direction detected in Step S1164 for the target page is a reverse direction to the rotational direction detected in Step S1113 for the previous page (Step S1165).

When the binding orientation setting unit 146b determines in Step S1165 that the rotational direction detected for the target page is the reverse direction to the rotational direction detected for the previous page, the binding orientation setting unit 146b cancels the setting of the binding orientation set in the immediately previous Step S1114 (Step S1166).

Subsequently, the display control unit 146c sets as the target the printing image on the page previous to the current target page among the plurality of pages of printing images acquired in Step S1101 (Step S1167), and executes the composite image displaying processing illustrated in FIG. 16 (Step S1168).

Subsequently, the display control unit 146c executes the processing of Step S1110.

When the binding orientation setting unit 146b determines in Step S1165 that the rotational direction detected for the target page is not the reverse direction to the rotational direction detected for the previous page, the display control unit 146c displays the error indicating that the direction of the turning-over is inappropriate on the display unit 142 (Step S1169), then executes the composite image displaying processing illustrated in FIG. 16 (Step S1170), and executes the processing of Step S1161.

Next, a description is made of an operation of the image forming system 110 performed when the MFP is used for print the printing image.

When instructed to perform printing on the paper sheet through the operation unit 141, the control unit 146 of the mobile device 140 transmits the plurality of pages of printing images acquired in Step S1101 along with double-sided printing setting information indicating a setting relating to the double-sided printing to the MFP received in Step S1102 through the network communication unit 144. Here, the double-sided printing setting information includes information indicating whether or not the double-sided printing has been set in Step S1109. Further, the double-sided printing setting information includes information on the binding orientation of each paper sheet set in Step S1114 when the double-sided printing is set.

Therefore, the control unit of the MFP uses the double-sided printing setting information transmitted from the mobile device 140 along with the printing image to print the printing image transmitted from the mobile device 140 on the paper sheet by the printer. In other words, when the double-sided printing setting information includes the information indicating that the double-sided printing has not been set, the control unit of the MFP subjects the printing image transmitted from the mobile device 140 to single-sided printing on the paper sheet. On the other hand, when the double-sided printing setting information includes the information indicating that the double-sided printing has been set, the control unit of the MFP subjects the printing image transmitted from the mobile device 140 to the double-sided printing on the paper sheet based on the information on the setting of the binding orientation of each paper sheet included in the double-sided printing setting information.

As described above, the mobile device 140 causes the user to turn over the actual paper sheet, to thereby set the binding orientation corresponding to the rotational direction of the turning-over with respect to the paper sheet (Steps S1112 to S1114), and hence it is possible to allow the user to intuitively designate the binding orientation for the double-sided printing performed on the MFP.

The mobile device 140 causes the user to turn over the actual paper sheet to set the binding orientation (Step S1114), and then causes the user to actually turn over the paper sheet in a rotational direction for cancellation serving as a rotational direction used for canceling the setting, to thereby cancel the setting of the binding orientation (Steps S1133 to S1136 or Steps S1163 to S1166) that allows the user to easily instruct the cancellation of the setting of the binding orientation.

Here, the mobile device 140 causes the user to turn over the actual paper sheet to set the binding orientation, and then causes the user to actually turn over the paper sheet in the rotational direction for cancellation that is the reverse direction to the rotational direction of the turning-over, in other words, causes the user to actually execute an operation that is reverse to the operation for setting the binding orientation (YES in Step S1135 or YES in Step S1165), to thereby cancel the setting of the binding orientation (Steps S1133 to S1136 or Steps S1163 to S1166) that allows the user to intuitively instruct the cancellation of the setting of the binding orientation.

Note that, the mobile device 140 may be provided with the rotational direction for cancellation that is a rotational direction other than the reverse direction to the rotational direction for setting the binding orientation. Further, the mobile device 140 may not be provided with the rotational direction for cancellation itself.

The mobile device 140 sets the binding orientation for the double-sided printing on the first paper sheet of two successive paper sheets to be subjected to the double-sided printing (Step S1114), and when a rotational direction for shift that is a rotational direction used for shifting to a state of being ready to receive the setting of the binding orientation for the double-sided printing on the second paper sheet is detected (YES in Step S1139), shifts to the state of being ready to receive the setting of the binding orientation for the double-sided printing on the second paper sheet (YES in Step S1110 and Step S1112). According to this configuration, the mobile device 140 causes the user to turn over the actual paper sheet to set the binding orientation, and then causes the user to actually turn over the paper sheet in the rotational direction for shift, to thereby shift to the state of being ready to receive the setting of the binding orientation for the double-sided printing on the second paper sheet of the two successive paper sheets to be subjected to the double-sided printing that allows the user to easily instruct the shift to the state of being ready to receive the setting of the binding orientation for the double-sided printing on the second paper sheet. Note that "a state of being ready" may be herein referred to as "a ready state."

Here, the mobile device 140 causes the user to turn over the actual paper sheet to set the binding orientation, and then causes the user to actually turn over the paper sheet in the rotational direction for shift that is the same direction as the rotational direction of the turning-over (YES in Step S1139), to thereby be able to shift to the state of being ready to receive the setting of the binding orientation for the double-sided printing on the second paper sheet (YES in Step S1110 and Step S1112). However, the mobile device 140 may be provided with the rotational direction for shift that is a rotational direction other than the same direction as the rotational direction for setting the binding orientation. For example, the mobile device 140 may be configured to employ all rotational directions other than the rotational direction for cancellation as the rotational direction for shift. Further, the mobile device 140 may not be provided with the rotational direction for shift itself when, for example, being configured to shift to the state of being ready to receive the setting of the binding orientation for the double-sided printing on the second paper sheet based on a specific operation performed through the operation unit 141 or being configured in the first place so that all the settings of the binding orientations for the double-sided printing on a plurality of successive paper sheets are the same.

The mobile device 140 displays the composite image that combines the printing image on the paper sheet within the image scanned by the imaging unit 143, on the display unit 142 as the preview image (Step S1204), and can therefore reflect the appearance of the actual paper sheet on the preview image, with the result that the preview image close to the actual printed matter can be generated.

The mobile device 140 recognizes the paper sheet itself within the scanned image by the image recognition technology, to thereby recognize that the paper sheet is included in the scanned image, and can therefore display the composite image that combines the printing image on the paper sheet within the scanned image, on the display unit 142 as the preview image even when the special marker used for recognizing that the paper sheet is included in the scanned image is not formed on the paper sheet.

Note that, the mobile device 140 may be configured to recognize that the paper sheet is included in the scanned image by reading the special marker used for recognizing that the paper sheet is included in the scanned image from above the paper sheet.

The mobile device 140 changes the appearance of the preview of the printing image within the composite image based on the output characteristic of the MFP by receiving the designation of the MFP that is to print the printing image on the paper sheet, and hence the preview image suitable for the MFP used for printing the printing image can be easily displayed on the display unit 142.

The mobile device 140 displays the composite image that combines the printing image on the paper sheet within the image scanned by the imaging unit 143, on the display unit 142 as the preview image (Step S1204), and can therefore allow the user to specifically imagine a result of the double-sided printing, with the result that it is possible to allow the user to more intuitively designate the binding orientation for the double-sided printing performed on the MFP. However, the mobile device 140 may be configured to inhibit the preview image from being displayed on the display unit 142 when the binding orientation for the double-sided printing is set in the processing illustrated in FIG. 13 to FIG. 15.

The mobile device 140 can allow the user to confirm the scanned image displayed on the display unit 142 when causing the user to turn over the actual paper sheet, and can therefore allow the user to confirm that an act of turning over the paper sheet is recognized by the mobile device 140 that can improve operability. However, the mobile device 140 may be configured to inhibit the image scanned by the imaging unit 143 from being displayed on the display unit 142 when the binding orientation for the double-sided printing is set in the processing illustrated in FIG. 13 to FIG. 15.

Note that, the image forming system 110 includes a mobile device as the electronic device according to the embodiment of the present disclosure, but may include another electronic device such as a PC or the like instead of the mobile device.

Further, the image forming system 110 includes an MFP as the image forming apparatus according to the embodiment of the present disclosure, but may include another image forming apparatus such as a dedicated printer, a dedicated copier, a dedicated facsimile device, or the like instead of the MFP.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device, comprising:
an imaging device configured to scan a paper sheet, wherein the paper sheet comprises a first side and a second side, wherein scanning the paper sheet produces an image;
a display device;
a printing image acquisition unit configured to acquire a printing image to be printed on an image forming apparatus;
a display control unit configured to control the display device to display, if the produced image includes an image of a paper sheet, a composite image in which the acquired printing image and the image of the paper sheet included in the produced image are combined;
a rotational direction detection unit configured to detect, if the paper sheet is turned over from the first side to the second side, a rotational direction in which the paper sheet is turned over with respect to the paper sheet; and
a binding orientation setting unit configured to set a binding orientation for double-sided printing performed on the image forming apparatus, wherein:
the rotational direction detection unit is configured to detect, if the produced image includes the image of the paper sheet, the rotational direction with respect to the paper sheet; and
the binding orientation setting unit is configured to set the binding orientation corresponding to the detected rotational direction.

2. The electronic device according to claim 1, wherein the binding orientation setting unit is further configured to cancel, after setting the binding orientation, the binding orientation for double-sided printing if a rotational direction for cancellation is detected via the rotational direction detection unit.

3. The electronic device according to claim 2, wherein the rotational direction for cancellation includes a reverse direction to the rotational direction if the binding orientation setting unit cancels the setting corresponding to the rotational direction.

4. The electronic device according to claim 1, wherein the display control unit is further configured to determine whether the image of the paper sheet is included in the produced image using an image recognition technology.

5. The electronic device according to claim 1, further comprising:
an apparatus designation reception unit configured to receive a designation indicative of the image forming apparatus,
wherein the display control unit is further configured to change an appearance of the acquired printing image within the composite image based on an output characteristic of the designated image forming apparatus.

6. A non-transitory computer-readable recording medium having stored a print preview program executable by a computer of an electronic device, the print preview program comprising:

a first program code for causing the computer to scan a paper sheet, wherein the paper sheet comprises a first side and a second side, wherein scanning the paper sheet produces an image;
a second program code for causing the computer to acquire a printing image;
a third program code for causing the computer to print the printing image on an image forming apparatus;
a fourth program code for causing the computer to control a display device to display, if the produced image includes an image of a paper sheet, a composite image in which the acquired printing image and the image of the paper sheet included in the produced image are combined;
a fifth program code for causing the computer to detect, if the paper sheet is turned over from the first side to the second side, a rotational direction in which the paper sheet is turned over with respect to the paper sheet; and
a sixth program code for causing the computer to set a binding orientation for double-sided printing performed on the image forming apparatus, wherein
the fifth program code further causes the computer to detect, if the produced image includes the image of the paper sheet, the rotational direction with respect to the paper sheet, and
the sixth program code further causes the computer to set the binding orientation corresponding to the detected rotational direction detected by the fifth program code.

7. The non-transitory computer-readable recording medium according to claim 6, wherein the print preview program further comprises:
a seventh program code for causing the computer to determine whether the image of the paper sheet is included in the produced image using an image recognition technology.

8. The non-transitory computer-readable recording medium according to claim 6, wherein the print preview program further comprises:
an eighth program code for causing the computer to receive a designation indicative of the image forming apparatus; and
a ninth program code for causing the computer to change an appearance of the acquired printing image within the composite image based on an output characteristic of the designated image forming apparatus.

9. The non-transitory computer-readable recording medium according to claim 6, wherein the print preview program further comprises:
a tenth program code for causing the computer to cancel, after setting the binding orientation, the binding orientation for double-sided printing if a rotational direction for cancellation is detected by the fifth program code.

10. The non-transitory computer-readable recording medium according to claim 9, wherein the rotational direction for cancellation includes a reverse direction to the rotational direction if the setting corresponding to the rotational direction is canceled by the tenth program code.

11. The non-transitory computer-readable recording medium according to claim 6, wherein the print preview program further comprises:
an eleventh program code for causing the computer to shift to a ready state to receive the setting of the double-sided printing for a second paper sheet, after the setting of the double-sided printing or a first paper sheet, if a rotational direction for shifting to the ready state to receive the setting of the double-sided printing for the second paper sheet is detected by the fifth program code.

* * * * *